United States Patent
Xiao et al.

(10) Patent No.: US 11,856,338 B2
(45) Date of Patent: Dec. 26, 2023

(54) PROJECTION APPARATUS AND CONTROL METHOD THEREOF

(71) Applicant: Hisense Laser Display Co., Ltd, Qingdao (CN)

(72) Inventors: Jichen Xiao, Qingdao (CN); Xu Chen, Qingdao (CN); Yawen Zhu, Qingdao (CN)

(73) Assignee: HISENSE LASER DISPLAY CO., LTD, Qingdao (CN)

( * ) Notice: Subject to any disclaimer, the term of this patent is extended or adjusted under 35 U.S.C. 154(b) by 146 days.

(21) Appl. No.: 17/491,460

(22) Filed: Sep. 30, 2021

(65) Prior Publication Data

US 2022/0021855 A1 Jan. 20, 2022

Related U.S. Application Data

(63) Continuation-in-part of application No. PCT/CN2021/075977, filed on Feb. 8, 2021.

(30) Foreign Application Priority Data

Feb. 25, 2020 (CN) .......................... 202010115275.5
Feb. 25, 2020 (CN) .......................... 202010115286.3
Feb. 25, 2020 (CN) .......................... 202010115288.2

(51) Int. Cl.
*G03B 21/56* (2006.01)
*H04N 9/31* (2006.01)
*G03B 21/58* (2014.01)

(52) U.S. Cl.
CPC ......... *H04N 9/3155* (2013.01); *G03B 21/567* (2013.01); *G03B 21/58* (2013.01); *H04N 9/312* (2013.01); *H04N 9/3197* (2013.01)

(58) Field of Classification Search
CPC ...... G03B 21/58; G03B 21/56; G03B 21/562; H04N 9/3188
See application file for complete search history.

(56) References Cited

U.S. PATENT DOCUMENTS 2,150,543 A 3/1939 de Ybarrondo
2003/0222892 A1 12/2003 Diamond et al.
(Continued)

FOREIGN PATENT DOCUMENTS

CN 101930159 A 12/2010
CN 103309135 A 9/2013
(Continued)

OTHER PUBLICATIONS

Takada, Toshimichi; JP 2012257071 A, Dec. 27, 2012; Machine translation in English (Year: 2012).*
(Continued)

*Primary Examiner* — Ryan D Howard
(74) *Attorney, Agent, or Firm* — Morgan, Lewis & Bockius LLP

(57) ABSTRACT

A projection apparatus includes a screen, a reel, a projection display structure and a control assembly. The projection display structure is configured to project at least one image to be displayed. Each image to be displayed includes an optical image with content. The screen is configured to display at least one optical image with content in the at least one image to be displayed. The control assembly is connected to the reel and is configured to control the reel to rotate. The reel is further connected to the screen and is configured to drive the screen to move when rotating. The control assembly is further connected to the projection display structure, and the control assembly is further configured to control the projection display structure to project
(Continued)

the optical image with content in the image to be displayed onto an unfolded portion of the screen.

20 Claims, 15 Drawing Sheets

(56) References Cited

U.S. PATENT DOCUMENTS

| | | | |
|---|---|---|---|
| 2008/0292304 | A1 | 11/2008 | Hirai |
| 2010/0321642 | A1 | 12/2010 | Templier et al. |
| 2015/0029229 | A1 | 6/2015 | Voutsas |
| 2019/0172423 | A1 | 6/2019 | Kurokawa |
| 2019/0302584 | A1 | 10/2019 | Yamada |

FOREIGN PATENT DOCUMENTS

| | | | |
|---|---|---|---|
| CN | 103592764 | A | 2/2014 |
| CN | 108121232 | A | 6/2018 |
| CN | 108566544 | A | 9/2018 |
| CN | 109644249 | A | 4/2019 |
| CN | 208781415 | U | 4/2019 |
| CN | 109981851 | A | 7/2019 |
| CN | 209590508 | U | 11/2019 |
| CN | 110609485 | A | 12/2019 |
| CN | 110658673 | A | 1/2020 |
| CN | 110716383 | A | 1/2020 |
| CN | 111273511 | A | 6/2020 |
| JP | 2012-257071 | A | 12/2012 |
| JP | 2013-9021 | A | 1/2013 |

OTHER PUBLICATIONS

Office Action issued in corresponding Chinese Patent Application No. 202010115286.3 dated Mar. 21, 2022, with English translation.
Office Action issued in corresponding Chinese Patent Application No. 202010115275.5 dated May 19, 2022, with English translation.
Office Action issued in corresponding Chinese Patent Application No. 202010115288.2 dated Sep. 24, 2021, with English translation.
International Search Report and Written Opinion issued in corresponding International Application No. PCT/CN2021/075977 dated May 7, 2021, with English translation.

* cited by examiner

PROJECTION APPARATUS AND CONTROL METHOD THEREOF

CROSS-REFERENCE TO RELATED APPLICATIONS

This application is a continuation-in-part of International Application of PCT/CN2021/075977 filed on Feb. 8, 2021, which claims priority to Chinese Patent Applications No. 202010115288.2, No. 202010115275.5 and No. 202010115286.3, filed on Feb. 25, 2020, which are incorporated herein by reference in their entirety.

TECHNICAL FIELD

The present disclosure relates to the field of projection display technologies, and in particular, to a projection apparatus and control methods thereof.

BACKGROUND

A projection apparatus, such as a laser projection apparatus, is used to project and display images.

SUMMARY

In an aspect, a projection apparatus is provided. The projection apparatus includes a screen, a reel, a projection display structure and a control assembly. The projection display structure is configured to project at least one image to be displayed. Each image to be displayed includes an optical image with content. The screen is configured to display at least one optical image with content in the at least one image to be displayed. The control assembly is connected to the reel, and the control assembly is configured to control the reel to rotate. The reel is further connected to the screen, and the reel is configured to drive the screen to move when rotating. The control assembly is further connected to the projection display structure, and the control assembly is further configured to control the projection display structure to project the optical image with content in the image to be displayed onto an unfolded portion of the screen.

In another aspect, a control method of a projection apparatus is provided. The projection apparatus is the projection apparatus as described in the above embodiment. The control method is performed at the control assembly. The control method includes: receiving a startup instruction; controlling the reel to rotate to drive the screen to move in response to the startup instruction, so as to make the screen be unfolded from the reel; and controlling the projection display structure to project the optical image with content in the image to be displayed onto the unfolded portion of the screen in response to the startup instruction. A region corresponding to the optical image with content in the image to be displayed increases as the unfolded portion of the screen increases.

In yet another aspect, a control method of a projection apparatus is provided. The projection apparatus is the projection apparatus as described in the above embodiment. The control method is performed at the control assembly. The control method includes: receiving a shutdown instruction; controlling the reel to rotate to drive the screen to move in response to the shutdown instruction, so as to make the screen be wound on the reel; and controlling the projection display structure to project the optical image with content in the image to be displayed onto the unfolded portion of the screen in response to the shutdown instruction. A region corresponding to the optical image with content in the image to be displayed decreases as the unfolded portion of the screen decreases.

BRIEF DESCRIPTION OF THE DRAWINGS

In order to describe technical solutions in some embodiments of the present disclosure more clearly, the accompanying drawings to be used in the description of disclosure will be introduced briefly below. However, the accompanying drawings to be described below are merely some embodiments of the present disclosure, and a person of ordinary skill in the art can obtain other drawings according to these drawings without paying any creative effort. In addition, the accompanying drawings in the following description may be regarded as schematic diagrams, and are not limitations on actual sizes of products, and actual processes of methods involved in the embodiments of the present disclosure.

DETAILED DESCRIPTION

Figure 1A:
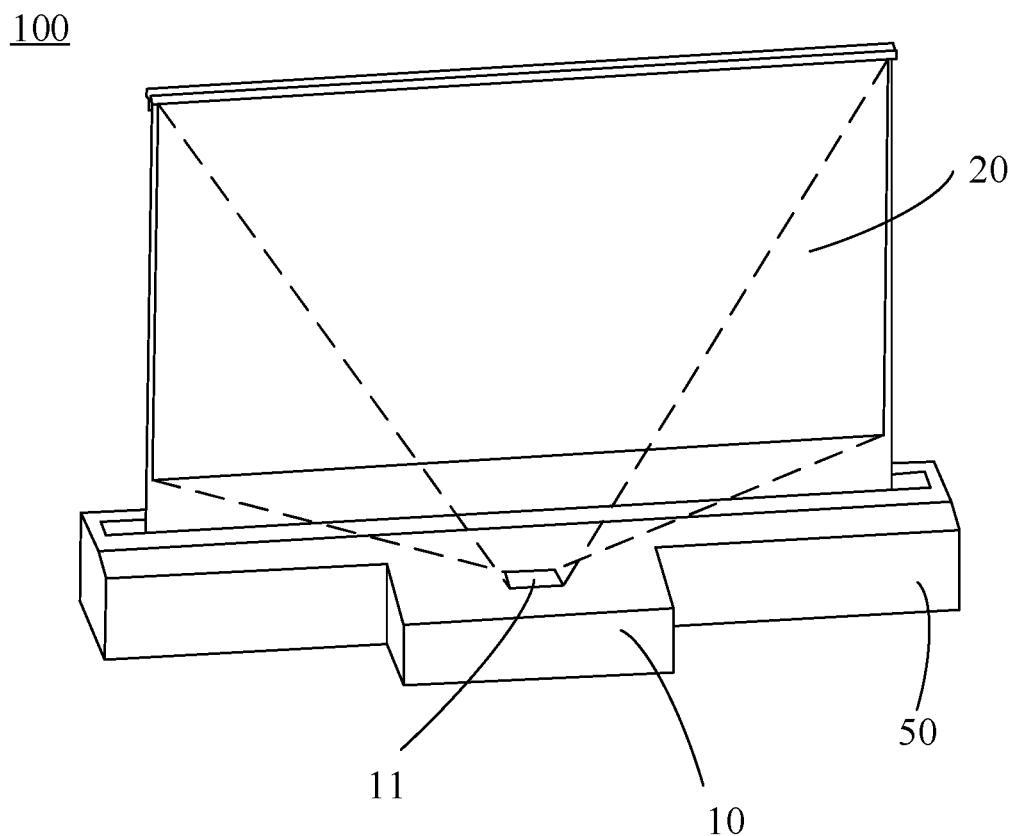
FIG. 1A is a schematic diagram showing a structure of a projection apparatus, in accordance with some embodiments.

Technical solutions in embodiments of the present disclosure will be described clearly and completely with reference to the accompanying drawings in the embodiments of the present disclosure. However, the described embodiments are merely some but not all embodiments of the present disclosure. All other embodiments obtained by a person of ordinary skill in the art based on the embodiments of the present disclosure without paying any creative effort shall be included in the protection scope of the present disclosure.

Unless the context requires otherwise, the term "comprise" and other forms thereof such as the third-person singular form "comprises" and the present participle form "comprising" throughout the description and the claims are construed as open and inclusive meanings, i.e., "including, but not limited to". In the description, the terms such as "one embodiment", "some embodiments", "exemplary embodiments", "example", "specific example" or "some examples" are intended to indicate that specific features, structures, materials or characteristics related to the embodiment(s) or example(s) are included in at least one embodiment or example of the present disclosure. Schematic representations of the above terms do not necessarily refer to the same embodiment(s) or example(s). In addition, the specific features, structures, materials, or characteristics described herein may be included in any one or more embodiments or examples in any suitable manner.

Hereinafter, the terms "first" and "second" are used for descriptive purposes only, and are not to be construed as indicating or implying the relative importance or implicitly indicating the number of indicated technical features. Thus, a feature defined with "first", "second" may explicitly or implicitly include one or more of the features. In the description of the embodiments of the present disclosure, the term "a plurality of/the plurality of" means two or more unless otherwise specified.

In the description of some embodiments, the term "connected" and its extensions may be used. For example, the term "connected" may be used when describing some embodiments to indicate that two or more components are in direct physical or electrical contact with each other. However, the term "connected" may also mean that two or more components are not in direct contact with each other, but still cooperate or interact with each other. The embodiments disclosed herein are not necessarily limited to the contents herein.

The use of the phrase "configured to" herein means an open and inclusive expression, which does not exclude devices that are configured to perform additional tasks or steps.

The term "approximately" as used herein includes a stated value and an average value within an acceptable range of deviation of a particular value. The acceptable range of deviation is determined by a person of ordinary skill in the art in view of the measurement in question and the error associated with the measurement of a particular quantity (i.e., the limitations of the measurement system).

In addition, the use of the phrase "based on" is meant to be open and inclusive, since a process, step, calculation or other action that is "based on" one or more recited conditions or values may, in practice, be based on additional conditions or values beyond those recited.

A projection apparatus, such as a laser projection apparatus, includes a screen and a laser projection host. The laser projection host includes a laser light source, and the laser light source has the advantages such as good monochromaticity, and high brightness. Therefore, the projected image has rich colors and good brightness and contrast, so that the projected image has a high quality.

The screen may be an optical screen. The optical screen may include a plurality of optical films. The optical screen has a high gain, and is able to restore the quality of the image projected by the laser light source, and may be used for reflecting the obliquely incident lights for ultra-short focal projection.

A size of the optical screen increases as a size of the projected image increases, and sizes of the optical films also increase to match the projected image. In this case, a support structure (e.g., a backplane or a frame) may be provided to support and fix the optical film. Therefore, the screen may occupy a large space, and it is difficult to adjust the position of the fixed screen.

Figure 1B:
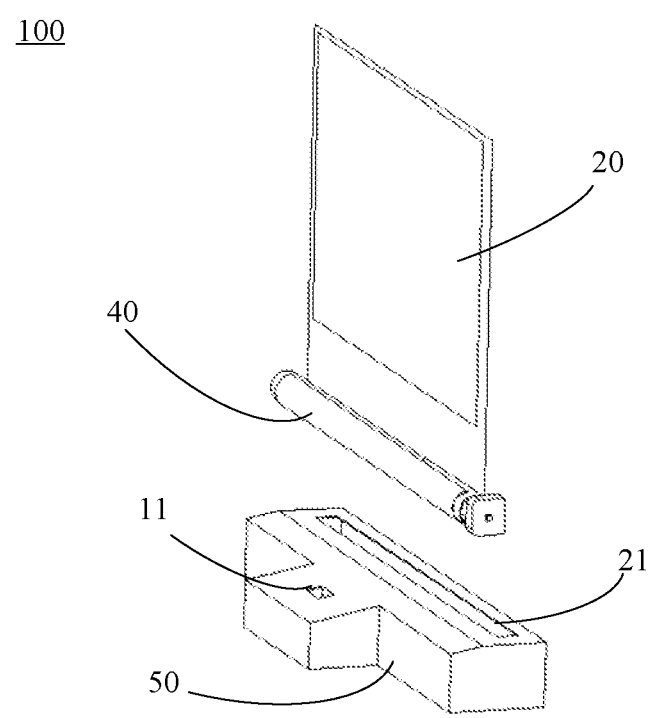
FIG. 1B a schematic diagram showing an exploded structure of the projection apparatus in FIG. 1A.
Figure 1C:
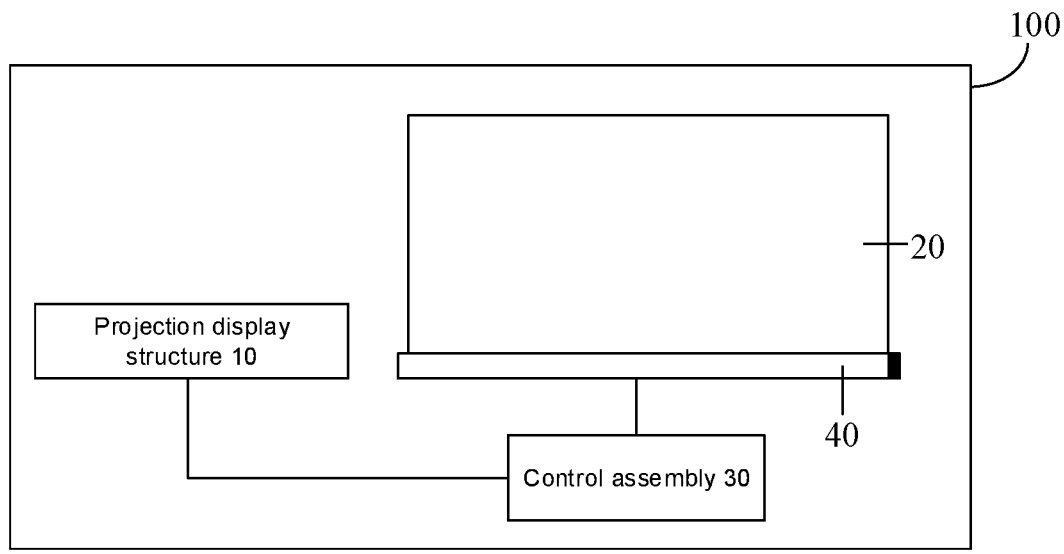
FIG. 1C is a block diagram showing a projection apparatus, in accordance with some embodiments.

FIG. 1A illustrates a structure of a projection apparatus, and FIG. 1B illustrates an exploded structure of the projection apparatus in FIG. 1A. As shown in FIGS. 1A and 1B, the projection apparatus 100 provided in the embodiments of the present disclosure includes a projection display structure 10, a screen 20 and a reel 40.

The projection display structure 10 is configured to project image(s) to be displayed. Each image to be displayed includes an optical image with content. For example, the projection display structure 10 includes an optical engine. The optical engine may be an ultra-short-focus projection optical engine, so as to realize a large-size image display under a small projection ratio.

The ultra-short-focus projection optical engine includes a laser projection light source, an optical-mechanical assembly and a lens assembly. The laser projection light source is configured to provide an illumination beam to the optical-mechanical assembly. The optical-mechanical assembly is configured to modulate the illumination beam provided by the laser projection light source according to an image signal, and transmit the modulated light beam to the lens assembly. For example, the optical-mechanical assembly includes a light valve. The lens assembly may be an ultra-short-focus projection lens. The lens assembly is configured to amplify the modulated light beam to obtain the image beam, and project the image beam onto the screen 20.

The screen 20 is configured to display at least one optical image with content in the at least one image to be displayed. For example, the screen 20 receives image beam corresponding to the at least one optical image with content in the at least one image to be displayed to display the at least one optical image with content in the at least one image to be displayed. The screen 20 may be a Fresnel optical screen with a high contrast ratio and a high gain, and thus the display effect of the laser optical image may be improved.

The screen 20 is a flexible screen. That is, the screen 20 can be curled. For example, the screen 20 is wound on the reel 40. For another example, the screen 20 is unfolded from the reel 40.

In some embodiments, as shown in FIG. 1A, the projection apparatus further includes an accommodating portion 50. The accommodating portion 50 is provided with a light-exit opening 11, and the light-exit opening 11 is configured to exit the image beam corresponding to the image to be displayed. The projection display structure 10 and the reel 40 are arranged in the accommodating portion 50.

For example, an internal space of the accommodating portion 50 is divided into sub-space(s) according to component(s) arranged in the accommodating portion 50. The projection display structure 10 is arranged in one sub-space in the accommodating portion 50, and the reel 40 and the screen 20 completely wound on the reel 40 are arranged in another sub-space in the accommodating portion 50.

For example, as shown in FIG. 1B, the accommodating portion 50 is further provided with an opening 21. In the case where the screen 20 is unfolded from the reel 40, the wound screen 20 moves from the reel 40 to an outside of the accommodating portion 50 through the opening 21. That is, the screen 20 is in a rising state. In the case where the screen 20 is wound on the reel 40, the unfolded screen 20 moves from the outside of the accommodating portion 50 to the reel 40 through the opening 21. That is, the screen 20 is in a descending state.

The projection apparatus 100 may be a laser television.

Figure 10:
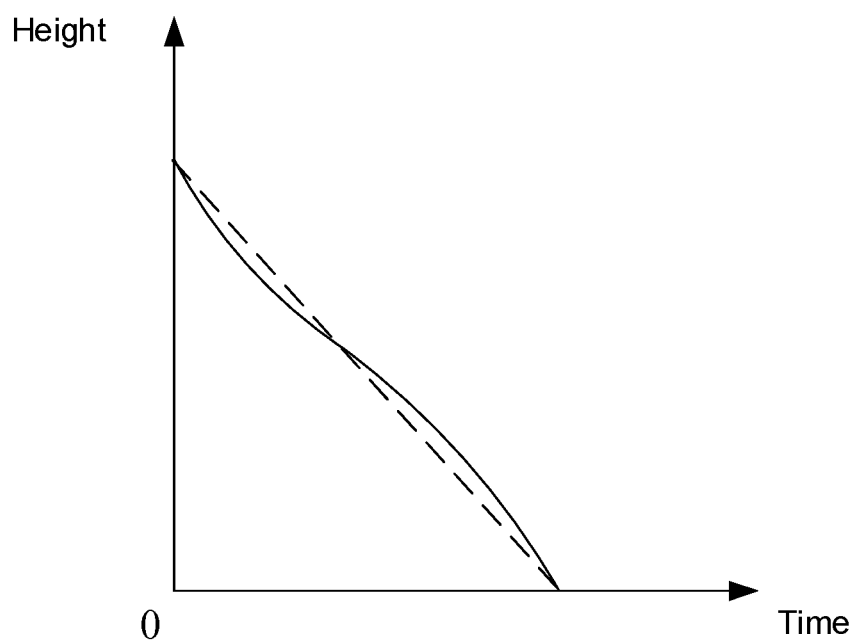
FIG. 10 is a graph showing descending speed curves of a screen, in accordance with some embodiments.

As shown in FIG. 10, the projection apparatus 100 provided in the embodiments of the present disclosure further includes a control assembly 30.

The reel 40 is connected to the control assembly 30. The screen 20 is connected to the reel 40. The control assembly 30 is configured to control the reel 40 to rotate. The reel 40 is configured to drive the screen 20 to move. The control assembly 30 is further connected to the projection display structure 10. The control assembly 30 is configured to control the projection display structure 10 to project the optical image with content in the image to be displayed onto an unfolded portion of the screen 20.

In some examples, the screen 20 moves away from the reel 40 in a direction perpendicular to an axial direction of the reel 40. That is, the screen 20 moves up, so as to be gradually unfolded from the reel 40. In some other examples, the screen 20 moves close to the reel 40 in the direction perpendicular to the axial direction of the reel 40. That is, the screen 20 moves down, so as to be gradually wound on the reel 40.

The control assembly 30 is further configured to control a region corresponding to the optical image with content in the image to be displayed projected by the projection display structure 10 to change as the unfolded portion of the screen 20 changes.

In the case where the screen 20 is unfolded from the reel 40, the unfolded portion of the screen 20 is increased, and thus the control assembly 30 controls the projection display structure 10 to make the region of the image beam of the optical image with content projected onto the unfolded portion of the screen 20 be increased according to the unfolded portion of the screen 20. In a case where the screen 20 is wound on the reel 40, the unfolded portion of the screen 20 is decreased, and thus the control assembly 30 controls the projection display structure 10 to make the region of the image beam of the optical image with content projected onto the unfolded portion of the screen 20 according to the unfolded portion of the screen 20 be decreased according to the unfolded portion of the screen 20.

In some embodiments, the image to be displayed further includes an optical image without content. In some examples, the control assembly 30 is further configured to control the projection display structure 10 not to project an optical image to a second region beyond a first region where the unfolded portion of the screen 20 is located. That is, there is no image beam projected on the second region beyond the first region where the unfolded portion of the screen 20 is located. In some other examples, the control assembly 30 is further configured to control the projection display structure 10 to project the optical image without content in the image to be displayed onto the second region beyond the first region where the unfolded portion of the screen 20 is located. That is, an image beam corresponding to the optical image without content is irradiated to the second region beyond the first region where the unfolded portion of the screen 20 is located. For example, the second region beyond the first region where the unfolded portion of the screen 20 is located is provided with a wall or other objects at the back of the unfolded portion of the screen 20.

In some examples, the image to be displayed is provided with a plurality of pixels. Pixel values of pixels in the optical image with content are not completely same. For example, the pixel values of pixels in the optical image with content are different. The optical image with content may have a clear content relative to the optical image without content. For example, the optical image with content is a color image.

In some examples, pixel values of pixels in the optical image without content are the same. For example, the pixel values of pixels in the optical image without content are equal to a preset value, and the preset value is greater than 0. The optical image without content may be an image of a pure color, and the optical image without content is an image with low brightness. The color of the optical image without content may match a color of the wall at the back of the screen 20; or, the optical image without content may be an image with unchanged content. For another example, the pixel values of pixels in the optical image without content are equal to zero. In this case, the light beam corresponding to the pixel values of the pixels in the optical image without content will not be transmitted into the lens, and no light beam will be projected through the light-exit opening 11 on the second region.

It will be noted that, a height of the unfolded portion of the screen 20 changes during the screen 20 is moving. The height of the unfolded portion of the screen 20 is a distance, in a direction (e.g., a direction perpendicular to an axial direction of the reel 40) in which the screen 20 moves (e.g., rises or descends), between a side of the unfolded portion of the screen 20 away from the reel 40 and a side of the unfolded portion of the screen 20 close to the reel 40. The height of the unfolded portion of the screen 20 may be a width, in the direction where the screen 20 moves of the first region where the unfolded portion of the screen 20 is located.

Figure 2A:
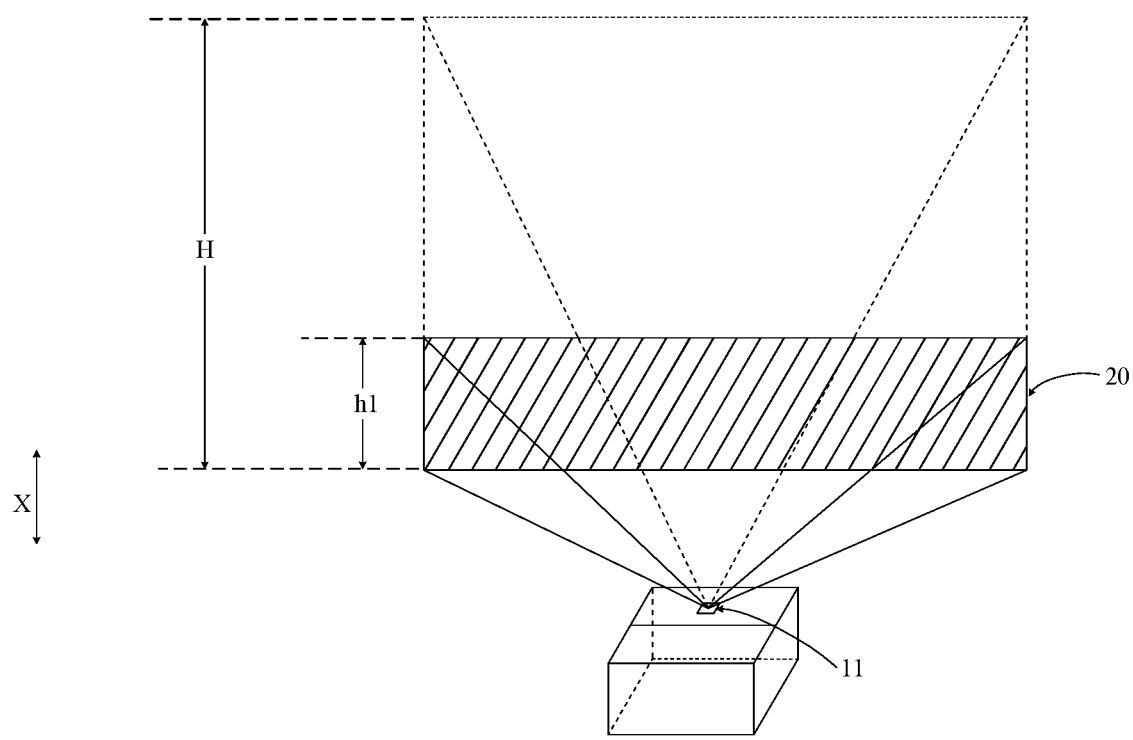
FIG. 2A is a schematic diagram showing that an image to be displayed is projected onto an unfolded screen, in accordance with some embodiments.
Figure 2B:
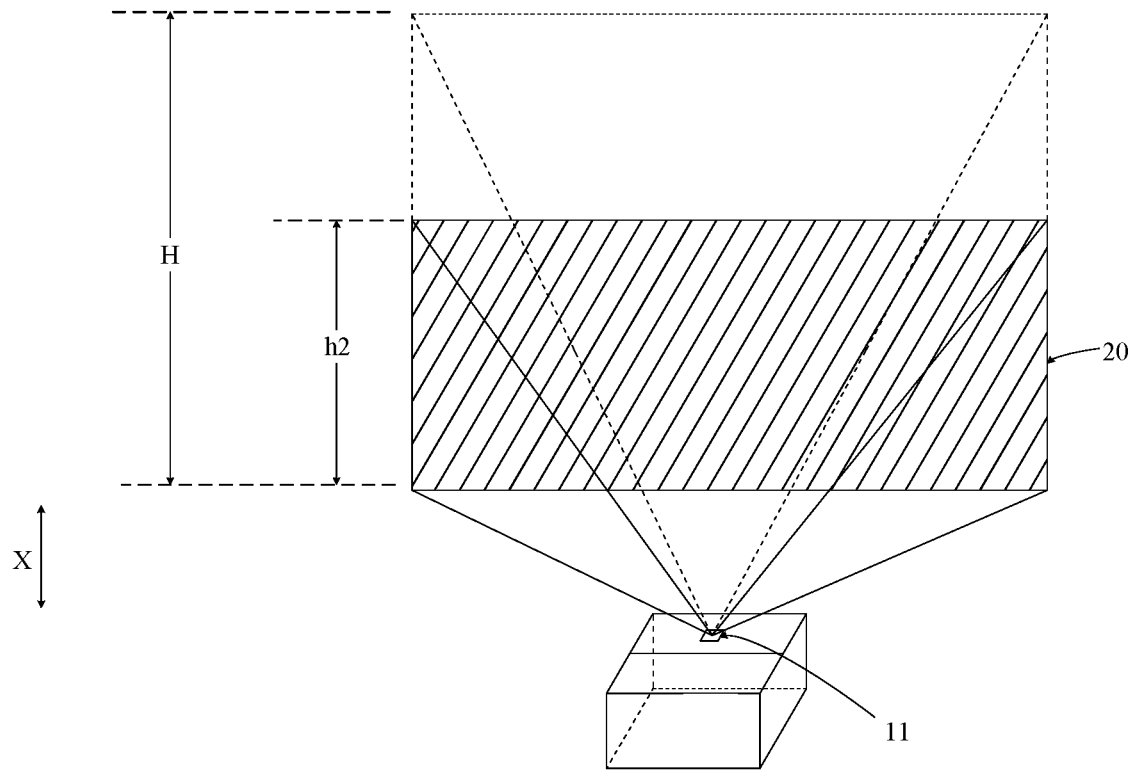
FIG. 2B is a schematic diagram showing that an image to be displayed is projected onto another unfolded screen, in accordance with some embodiments.

FIGS. 2A and 2B illustrate that image beams are projected on to two unfolded portions of the screen 20. The height of the unfolded portion of the screen 20 is also a distance, in the direction X in which the screen 20 moves, between a side of the unfolded portion of the screen 20 away from the light-exit opening 11 and a side of the unfolded portion of the screen 20 proximate to the light-exit opening 11. The height of the completely unfolded screen 20 is a maximum height of the unfolded screen 20. As shown in FIGS. 2A and 2B, the height (i.e., the maximum height) of the completely unfolded screen 20 is H; the height of the unfolded portion (i.e., a first unfolded portion) of the screen 20 shown in FIG. 2A is h1, the height of the unfolded portion (i.e., a second unfolded portion) of the screen 20 shown in FIG. 2B is h2, and h2 is greater than h1 (i.e., h2>h1). An area of the region where the first unfolded portion of the screen 20 is located is less than an area of the region where the second unfolded portion of the screen 20 is located.

In this case, a width of the region corresponding to the optical image with content projected onto the first unfolded portion of the screen 20 is h1, a width of the region corresponding to the optical image with content projected onto the second unfolded portion of the screen 20 is h2, and thus the region corresponding to the optical image with content projected onto the second unfolded portion of the screen 20 is greater than the region corresponding to the optical image with content projected onto the first unfolded portion of the screen 20.

In a process when the first unfolded portion of the screen 20 shown in FIG. 2A becomes the second unfolded portion of the screen 20 shown in FIG. 2B, the height of the unfolded portion of the screen 20 changes from h1 to h2, and thus the height of the unfolded portion of the screen 20 is increased. That is, the screen 20 is in the rising state, and the screen 20 is gradually unfolded from the reel 40. In this case, the control assembly 30 controls the projection display structure 10 to project the optical image with content onto the unfolded portion of the screen 20, and thus the width of the region corresponding to the optical image with content projected onto the unfolded portion of the screen 20 changes from h1 to h2. As a result, the region corresponding to the optical image with content projected onto the unfolded portion of the screen 20 is increased.

In a process when the second unfolded portion of the screen 20 shown in FIG. 2B becomes the first unfolded portion of the screen 20 shown in FIG. 2A, the height of the unfolded portion of the screen 20 is decreased, and thus the region corresponding to the optical image with content projected onto the unfolded portion of the screen 20 is decreased. That is, the screen 20 is in the descending state, and the screen 20 is gradually wound on the reel 40. In this case, the control assembly 30 controls the projection display structure 10 to project the optical image with content onto the unfolded portion of the screen 20, and thus the width of the region corresponding to the optical image with content projected onto the unfolded portion of the screen 20 changes from h2 to h1. As a result, the region corresponding to the optical image with content projected onto the unfolded portion of the screen 20 is decreased.

In a case where the height of the unfolded screen 20 does not reach the maximum height H when the screen 20 rises or descends, the projection display structure 10 projects the image beam of the optical image with content onto the unfolded portion of the screen 20, and the screen 20 receives the projected image beam and displays the optical image with content.

In some examples, the width of the region corresponding to the optical image with content projected onto the unfolded portion of the screen 20 is equal to or approximately equal to the height of the unfolded portion of the screen 20. The region corresponding to the optical image with content projected onto the unfolded portion of the screen 20 may coincide or approximately coincide with the first region where the unfolded portion of the screen 20 is located. In this case, the optical image with content is always projected on the unfolded portion of the screen 20.

In some other examples, the width of the region corresponding to the optical image with content projected onto the unfolded portion of the screen 20 is less than the height of the unfolded portion of the screen 20. For example, a bottom edge of the region corresponding to the optical image with content projected onto the unfolded portion of the screen 20 is overlapped with a bottom edge of the first region where the unfolded portion of the screen 20 is located, and there is a distance (e.g., equal to a height of at least one pixel) between a top edge of the region corresponding to the optical image with content projected onto the unfolded portion of the screen 20 and a top edge of the first region where the unfolded portion of the screen 20 is located. For another example, the top edge of the region corresponding to the optical image with content projected onto the unfolded portion of the screen 20 is overlapped with the top edge of the region where the unfolded portion of the screen 20 is located, and there is a distance (e.g., equal to the height of at least one pixel) between the bottom edge of the region corresponding to the optical image with content projected onto the unfolded portion of the screen 20 and the bottom edge of the region where the unfolded portion of the screen 20 is located. In this case, the optical image with content is always projected on the unfolded portion of the screen 20.

The projection display structure 10 may further include a control component for processing image. In some embodiments, the projection display structure 10 processes the image to be displayed according to the maximum height of the unfolded screen 20. The light valve in the projection display structure 10 may receive driving signal(s) corresponding to the entire image to be displayed, and divides a region corresponding to the image to be displayed into sub-region(s) according to the driving signal(s) corresponding to the entire image to be displayed. The sub-region(s) corresponds to the driving signal(s) received by the light valve. The light valve modulates the illumination beam according to the received driving signal(s). The modulated illumination beam is amplified by the lens assembly, so as to obtain the image beam corresponding to the image to be displayed. The image beam corresponding to the image to be displayed is projected, and the width of the region corresponding to the entire image to be displayed is corresponds to the maximum height of the unfolded screen 20. That is, the width of the region corresponding to the entire image to be displayed is H.

Figure 2C:
FIG. 2C is a schematic diagram showing an image to be displayed, in accordance with some embodiments.

Referring to FIG. 2C, the height of the unfolded portion of the screen 20 is less than the height (i.e., H) of the completely unfolded screen 20, the region corresponding to the image to be displayed is divided into two sub-regions 01 and 02, and a sum of widths of the sub-regions 01 and 02 is equal to the height of the completely unfolded screen 20. That is, the sum of widths of the sub-regions 01 and 02 is equal to H. The sub-region 01 serves as the first region where the unfolded portion of the screen 20 is located, the sub-region 02 serves as the second region beyond the first region, and the first region and the second region constitute a region where the completely unfolded screen 20 is located.

In some examples, pixel values of pixels in a portion of the image to be displayed in the sub-region 02 are 0, and the portion of the image to be displayed in the sub-region 02 is a black image. The portion of the image to be displayed in the sub-region 02 may be the optical image without content. For another example, the pixel values of pixels in the portion of the image to be displayed in the sub-region 02 are a non-zero preset value. At least one pixel value of pixel values of pixels in a portion of the image to be displayed in the sub-region 01 is greater than 0. For example, the pixel values of pixels in the portion of the image to be displayed in the sub-region 01 are different and are greater than 0, and the portion of the image to be displayed in the sub-region 01 is a color image. The portion of the image to be displayed in the sub-region 01 may be the optical image with content.

In a case where pixel values of the plurality of pixels in the image to be displayed are 0, the light valve in the projection display structure 10 does not project the illumination beam into the lens, and the screen 20 is in a "black screen" state. Therefore, when the projection display structure 10 projects the image beam corresponding to the image to be displayed, there is no image beam exited through the light-exit opening 11 to the portion of the image to be displayed in the sub-region 02. However, pixel values of pixels in the portion of the image to be displayed in the sub-region 01 are different and correspond to different driving signals, the light valve modulates the illumination beam according to the different driving signals and transmits the modulated illumination beam to the lens, the lens amplified the modulated illumination beam to obtain the image beam, and the image beam is projected onto the screen 20 through the light-exit opening 11.

In addition, the pixel value of each pixel includes gray scale values of sub-pixels in the pixel, and a luminous flux of an image beam corresponding to a gray scale value of each sub-pixel in the pixel value of the pixel is different. Therefore, proportions of image beams corresponding to gray scale values of the plurality of sub-pixels (e.g., including red, green and blue (RGB) sub-pixels) in the pixel value of the pixel may be adjusted to obtain the color image is obtained, so as to obtain the optical image with content.

In some embodiments, the optical image without content is a mono-color or pure color image. For example, the pixel values of the pixels in the portion of the image to be displayed in the sub-region 02 shown in FIG. 2C are set to the same value, so as to obtain the mono-color or pure color image. A luminous flux of the image beam of the optical image without content is low.

The image beam is obliquely exited upward through the light-exit opening 11. In this case, a lowest position (i.e., a position that the image beam can be projected onto, closest to the reel 40, of the completely unfolded screen 20) that the image beam can be projected onto, of the screen 20 is not a lowest position (i.e., a position, closest to the reel 40, of the completely unfolded screen 20) of the screen 20.

In some examples, the completely unfolded screen 20 is provided with an offset region, and the offset region is located on a lowest edge that the image beam can be projected onto, of the completely unfolded screen 20. For example, the offset region is between the lowest edge that the image beam can be projected onto, of the completely unfolded screen 20 and an orthogonal projection, on the completely unfolded screen 20, of the opening 21. There is no image beam irradiated to the offset region. For example, the offset region may be blocked by a structural member, and in this way, a bottom edge that can be exposed, of the completely unfolded screen 20 is a lowest position that the image beam can be projected onto, of the completely unfolded screen 20. For another example, the offset region is directly exposed. In the above examples/embodiments, the height of the unfolded screen 20 refers to a distance between the lowest position that the image beam can be projected onto, of the completely unfolded screen 20 and a highest position that the image beam can be projected onto, of the completely unfolded screen 20, in the direction in which the screen 20 moves.

In addition, there is a driving signal corresponding to the optical image without content in the image to be displayed, so that the light value is driven according to the driving signal, and the image beam corresponding to the optical image without content may be exited through the light-exit opening 11 to the second region.

As shown in FIG. 10, the control assembly 30 is connected to the projection display structure 10. For example, the control assembly 30 is in communication connection with the projection display structure 10. It will be noted that, the communication connection refers to a connection established through a wired or wireless network. For example, the control assembly 30 is communicatively connected to the projection display structure 10 by RS-232 communication manner.

The control assembly 30 may further be connected to the reel 40. The control assembly 30 is further configured to control the reel 40 to rotate. The reel 40 is fixedly connected to an end of the screen 20. In this case, the control assembly 30 controls the reel 40 to rotate, so as to drive the screen 20 to be wound on the reel 40 or unfolded from the reel 40. Therefore, the screen 20 moves up or down.

In a case where the projection apparatus 100 projects the optical image, the control assembly 30 controls the reel 40 to rotate to unfold the screen 20 from the reel 40, and the screen 20 is stretched. In a case where the projection apparatus 100 stops projecting the optical image, the control assembly 30 controls the reel 40 to rotate to wind the unfolded screen 20 on the reel 40, and the screen 20 is retrieved. In this way, the space occupied by the screen 20 is effectively reduced, thereby reducing the space occupied by the projection apparatus.

In some embodiments, the at least one image to be displayed includes a plurality of images to be displayed. The projection display structure 10 is further configured to sequentially project image beams corresponding to the plurality of images to be displayed onto the screen 20. In some examples, optical images with content in at least two images to be displayed are different. The plurality of images to be displayed constitute a video, or an animated image.

Referring to FIGS. 2A and 2B, the optical image with content in the image to be displayed is projected onto the unfolded portion of the screen 20, and the optical image without content in the image to be displayed is projected onto the second region. The second region is a region other than the first region where the unfolded portion of the screen 20 located in the region where the completely unfolded screen 20 is located. For example, a width (i.e., the height of the unfolded portion of the screen 20) of the first region where the unfolded portion of the screen 20 located is h, a width (i.e., the height of the completely unfolded portion of the screen 20) of the region where the completely unfolded screen 20 is located is H, a width h' of the second region beyond the first region where the unfolded portion of the screen 20 is located is equal to a difference of H and h (i.e., h'=H−h). In this case, the height of the optical image with content displayed in the first region is h, and the height of the optical image without content displayed in the second region is H−h.

The pixels in the optical image with content in each image to be displayed may be arranged in an array. In some examples, the number of pixel rows in each optical image with content in two images to be displayed is different. A difference between the number of pixel rows in the optical image with content in one of any two adjacent images to be displayed and the number of pixel rows in the optical image with content in another of any two adjacent images to be displayed is the same. For example, there is one row of pixels in the optical image with content in the first image to be displayed, there are two rows of pixels in the optical image with content in the second image to be displayed, and there are three rows of pixels in the optical image with content in the third image to be displayed.

In some embodiments, the plurality of frames of images to be displayed is divided into a plurality of groups, and the number of pixel rows in each optical image with content in the image(s) to be displayed in each group is the same, and the number of pixel rows in the optical image with content in the image to be displayed in one of two adjacent groups and the number of pixel rows in the optical image with content in the image to be displayed in another of two adjacent groups are different. For example, pixels in the optical image with content in the first image to be displayed are arranged in one row, pixels in the optical image with content in the second image to be displayed are arranged in one row, and the first frame of image to be displayed and the second frame of image to be displayed are in the same group; and pixels in the optical image with content in the third image to be displayed are arranged in two rows, pixels in the optical image with content in the fourth image to be displayed are arranged in two rows, and the third image to be displayed and the fourth image to be displayed are in the same group.

It will be noted that, the difference between the number of pixel rows in the optical image with content in one of any two adjacent images to be displayed and the number of pixel rows in the optical image with content in another of any two adjacent images to be displayed is not fixed, which can be determined according to a relationship between the height of the screen 20 and time. For example, if the screen 20 rises fast, there is a first difference between the number of pixel rows in the optical image with content in one of any two adjacent images to be displayed and the number of pixel rows in the optical image with content in another of any two adjacent images to be displayed; if the screen 20 rises slowly, there is a second difference between the number of pixel rows in the optical image with content in one of any two adjacent images to be displayed and the number of pixel rows in the optical image with content in another of any two adjacent images to be displayed; and the first difference is greater than the second difference.

In some embodiments, the projection display structure 10 projects the plurality of images to be displayed at a fixed frequency.

The control assembly 30 is further configured to obtain a current movement parameter of the screen 20. The current movement parameter may be a current rising parameter of the screen 20, or a current descending parameter of the screen 20. For example, if the screen 20 is wound on the reel 40, the control assembly 30 obtains the current rising parameter of the screen 20; and if the screen 20 is unfolded from the reel 40, the control assembly 30 obtains the current descending parameter of the screen 20.

In some examples, the current movement parameter of the screen 20 includes at least one of a movement duration of the screen 20, an amount of change in the height of the unfolded portion of the screen 20, or a movement speed of the screen 20.

The control assembly 30 is provided with a preset movement parameter of the screen 20. The control assembly 30 is further configured to determine whether the current movement parameter of the screen 20 is equal to the preset movement parameter of the screen 20; and adjust the current movement parameter of the screen 20 in response to determining that the current movement parameter of the screen 20 is not equal to the preset movement parameter of the screen 20, so as to make a current unfolded portion of the screen 20 match an optical image with content in a current image to be displayed. That is, if the current movement parameter of the screen 20 is greater than or less than the preset movement parameter of the screen 20, the control assembly 30 adjusts the current movement parameter of the screen 20. For example, a height of the current unfolded portion of the screen 20 matches a region corresponding to the optical image with content in the current image to be displayed. In this way, it is possible to prevent the portion of optical image with content from being out of the screen 20.

For example, the projection apparatus 100 further includes a motor, and the motor is configured to drive the reel 40 to rotate. In this case, the movement speed of the screen 20 may be changed by adjusting a rotation speed of the motor, so as to change the current movement parameter of the screen 20.

The control assembly 30 may change the movement speed of the screen 20, so that the current movement parameter of the screen 20 is equal to or approximately equal to the preset movement parameter of the screen 20. The plurality of images to be displayed are projected at the fixed frequency. In some examples, when the screen 20 rises at a constant speed, rows of pixels in the optical images with content in two adjacent frames of images to be displayed is preset to increase uniformly or to increase with a fixed difference. In some other examples, when the screen 20 descends at a constant speed, rows of pixels in the optical images with content in two adjacent frames of images to be displayed is preset to decrease uniformly or to decrease with a fixed difference. For example, a difference between the rows of pixels in the optical image with content in the current image to be displayed and the rows of pixels in the optical image with content in a next frame of image to be displayed is a fixed difference, such as three. In this way, the change of the unfolded portion of the screen 20 may be consistent with the change of the rows of pixels in the optical image with content in the image to be displayed.

In some embodiments, before the screen 20 moves, the projection display structure 10 preprocesses a startup or shutdown video to be played to obtain images to be displayed of the startup or shutdown video. The optical images with content in the images to be displayed are different, and the optical images with content in two adjacent images to be displayed changes in a certain manner. In this way, when the projection display structure 10 projects the plurality of frames of images to be displayed on the screen 20, the movement of the region (i.e., a region of the unfolded portion of the screen 20 where the optical image with content is projected) corresponding to the optical image with content projected on the unfolded portion of the screen 20 follows the movement of the screen 20.

For example, the control assembly 30 drives the screen 20 to move (e.g., rise or descend) at a constant speed, and the movement speed of the screen 20 is an ideal movement speed of the screen 20. The projection display structure 10 may obtain the plurality of images to be displayed according to the ideal movement speed of the screen 20 before the screen 20 moves, and project the plurality of images to be displayed onto the screen 20 at the fixed frequency. In this case, the movement speed of the region corresponding to the optical image with content projected on the unfolded portion of the screen 20 is constant.

In some examples, the movement speed of the region corresponding to the optical image with content projected on the unfolded portion of the screen 20 is the same as the movement speed of the screen 20, so that the optical image displayed on the screen 20 has a good display effect during the movement of the screen 20.

For example, the top edge (e.g., an edge of the region corresponding to the optical image with content in the image to be displayed away from the reel 40) of the region corresponding to the optical image with content in the image to be displayed and the top edge (e.g., an edge of the first region where the unfolded portion of the screen 20 is located away from the reel 40) of the first region where the unfolded portion of the screen 20 is located coincide or have a small distance therebetween. In addition, the plurality of images to be displayed are obtained based on the ideal movement of the screen 20, and the preset movement parameter of the screen 20 is obtained based on the ideal movement of the screen 20, and thus the change of the plurality of images to be displayed is related to the preset movement parameter of the screen 20. For example, a ratio of the number of pixel rows in the optical image with content in the image to be displayed to the total number of pixel rows in the image to be displayed has a corresponding relationship with the preset movement parameter of the screen 20.

The control assembly 30 in the embodiments of the present disclosure adjusts the movement speed of the screen 20 according to the current movement parameter of the screen 20 and the preset movement parameter of the screen 20, so that the current movement parameter of the screen 20 and the preset movement parameter of the screen 20 are the same or approximately the same. In this way, the edge of the region corresponding to the optical image with content in the current image to be displayed coincides or approximately coincides with the edge of the region where the current unfolded portion of the screen 20 is located.

In some embodiments, the plurality of images to be displayed are processed in real time according to the preset movement parameter of the screen 20. For example, according to the preset movement parameter of the screen 20, the preset height of the current unfolded portion of the screen 20 at time t1 is hs1, and the actual height hs1' of the current unfolded portion of the screen 20 at time t1 is hs1+Δh, that is, hs1'=hs1+Δh, where Δh is the amount of change of height. In this case, the width of the region corresponding to the optical image with content in the current image to be displayed is processed as the preset height hs1 of the unfolded screen 20.

It will be noted that, the preset movement parameter of the screen 20 and a preset projection region corresponding to the optical image with content in each image to be displayed are pre-stored in the control assembly 30.

In some examples, the screen 20 is in the rising state, the current movement parameter of the screen 20 is greater than the preset movement parameter, and a difference between the current movement parameter of the screen 20 and the preset movement parameter is within a certain range. For example, the amount of change in height in the unfolded portion of the screen 20 is small, and the plurality of images to be displayed is projected at a preset fixed frequency. The preset fixed frequency may be 60 Hz. The height of the current unfolded portion of screen 20 is greater than the width of the region corresponding to the optical image with content in the current image to be displayed. In this case, there is a distance, in the direction in which the screen 20 moves, between the top edge of the region corresponding to the optical image with content in the image to be displayed and the top edge of the first region where the unfolded portion of the screen 20 is located, and the distance is a constant or with in a small range. In this way, the current movement parameter of the screen 20 does not change, the region corresponding to the optical image with content in the image to be displayed does not change, and the image to be displayed is projected at a fixed frequency. The region corresponding to the optical image with content in the image to be displayed may be preset.

In some other examples, the screen 20 is in the descending state, the current movement parameter of the screen 20 is less than the preset movement parameter of the screen 20, and a difference between the current movement parameter of the screen 20 and the preset movement parameter of the screen 20 is within the certain range. For example, the preset height of the unfolded portion of the screen is hs2, the actual height of the unfolded portion of the screen hs2' is hs2+Δh, i.e., hs2'=hs2+Δh. In this case, the descending speed of the screen is less than the preset descending speed. Therefore, the region corresponding to the optical image with content in the image to be displayed descends as the unfolded portion of the screen 20 descends, and the amount of change of the region corresponding to the optical image with content in the image to be displayed is related to the difference between the current movement parameter of the screen 20 and the preset movement parameter of the screen 20.

In some examples, when the screen 20 is in the rising state, the current movement parameter of the screen 20 is less than the preset movement parameter, the rising speed of the screen 20 is less than the preset rising speed, and the actual rising height of the screen 20 is less than the preset height of the unfolded portion of the screen 20. In some other examples, when the screen 20 is in the descending state, the current movement parameter of the screen 20 is greater than the preset movement parameter, the descending speed of the screen 20 is greater than the preset descending speed, and the actual height of the unfolded screen 20 is less than the preset height of the unfolded portion of the screen 20.

Based on this, the rising speed of the screen 20 is increased, and the descending speed of the screen 20 is reduced, so as to ensure that the unfolded portion of the screen 20 receives the image beam of the optical image with content in the image to be displayed. The preset projection region corresponding to the optical image with content in the image to be displayed is less than or equal to the region where the unfolded portion of the screen 20 is located, thereby preventing the optical image from being out of the current unfolded portion of the screen 20.

In some embodiments, the control assembly 30 is further configured to adjust the region corresponding to the image beam of at least one optical image with content in at least one image to be displayed according to the current movement parameter of the screen 20, so as to make the region corresponding to the image beam of at least one optical image with content in at least one image to be displayed according to the current movement parameter of the screen 20 match the current unfolded portion of the screen 20. For example, the region corresponding to the at least one optical image with content in at least one image to be displayed according to the current movement parameter of the screen 20 matches the height of the unfolded portion of the screen 20.

In some embodiments, when the screen moves (e.g., rises or descends), the control assembly 30 adds content to each optical image with content in at least one image to be displayed in the plurality of images to be displayed according to the current movement parameter, in response to determining that the current movement parameter is greater than the preset movement parameter, so as to make at least one region corresponding to the added optical image with content in the at least one image to be displayed match a current unfolded portion of the screen 20. For example, the control assembly 30 adds content to the optical image with content in the current image to be displayed according to the height of the current unfolded portion of the screen 20, in response to determining that the current movement parameter is greater than the preset movement parameter. A region corresponding to the added content is located on the bottom edge of the region corresponding to the optical image with content in the current image to be displayed. In this way, a region corresponding to the added optical image with content in the current image to be displayed matches the height of the current unfolded portion of the screen 20.

The added content is an extra portion of the optical image with content in another image to be displayed compared to the optical image with content in the current image to be displayed. For example, the another image to be displayed is a previous image to be displayed. For another example, the another image to be displayed is a next image to be displayed. For yet another example, the another image to be displayed and the current image to be displayed have at least one image to be displayed therebetween.

Figure 2D:
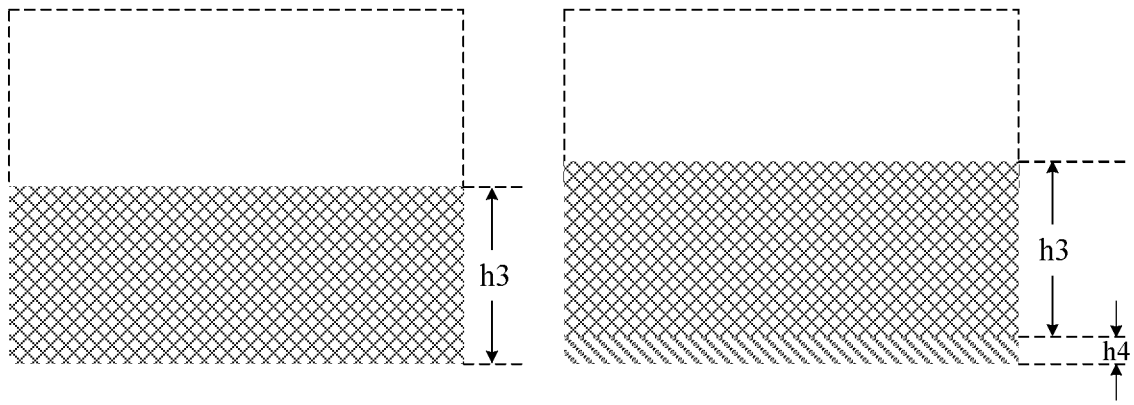
FIG. 2D is a schematic diagram showing a process of adjusting an image to be displayed, in accordance with some embodiments.

FIG. 2D illustrates a process of the image to be displayed. As shown in FIG. 2D, the width of the preset projection region corresponding to the optical image with content in the image to be displayed is h3, which matches the height of the unfolded portion of the screen 20 corresponding to the preset movement parameter of the screen 20. If the current movement parameter of the screen 20 is greater than the preset movement parameter of the screen 20, for example, the height of the current unfolded portion of the screen 20 is greater than the preset height of the unfolded portion of the screen 20, the top edge of the preset projection region corresponding to the optical image with content in the image to be displayed is lower than the top edge of the first region where the unfolded portion of the screen 20 is located. By adding content to the optical image with content in the image to be displayed, the region corresponding to the added content is located on the bottom edge of the region corresponding to the optical image with content in the image to be displayed, and thus the region corresponding to the added optical image with content in the current image to be displayed match the height of the current unfolded portion of the screen 20. For example, since the height hc of the current unfolded portion of the screen 20 is h3+h4 (i.e., hc=h3+h4), the width of the region corresponding to the added content is h4. In this case, the top edge of the region corresponding to the adjusted optical content in the image to be displayed may coincide with the top edge of the region where the current unfolded portion of the screen 20 is located, and the image displayed on the screen 20 rises as the screen 20 rises.

Figure 9:
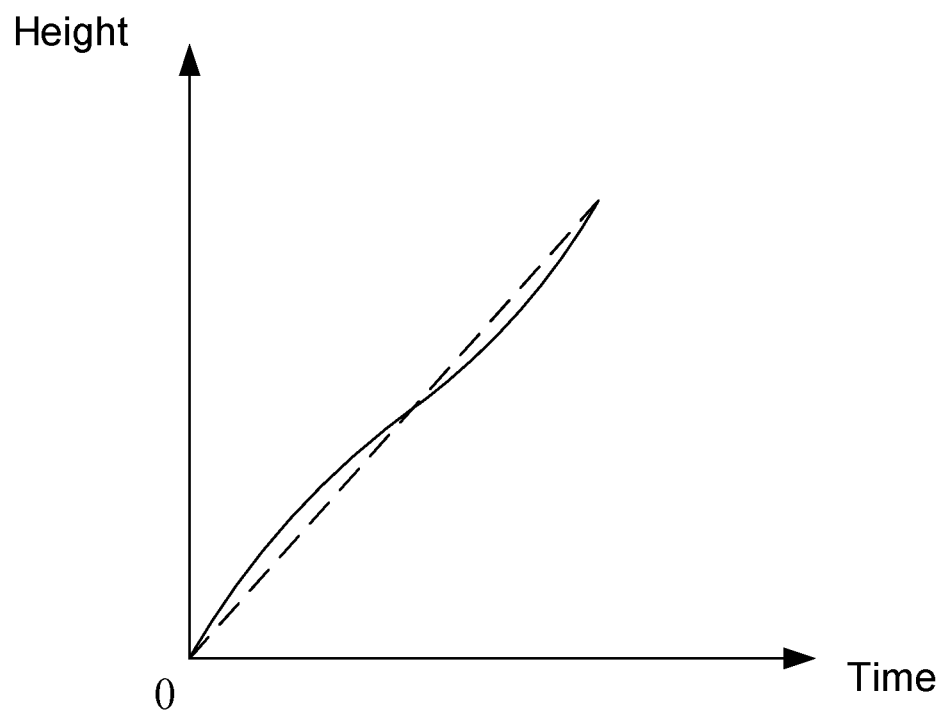
FIG. 9 is a graph showing rising speed curves of a screen, in accordance with some embodiments.

FIGS. 9 and 10 illustrate rising speed curves of the screen 20 and descending speed curves of the screen 20, respectively, where the ordinate represents the height of the unfolded screen 20, the abscissa represents time. As shown in FIG. 9, the solid line represents an actual rising speed curve of the screen 20, and the dashed line represents an ideal rising speed curve of the screen 20, and the ideal rising speed is a speed at which the control assembly 30 controls the screen 20 to rise uniform. As shown in FIG. 10, the solid line represents an actual descending speed curve of the screen 20, and the dashed line represents an ideal descending speed curve of the screen 20, and the ideal descending speed refers to a speed at which the control assembly 30 controls the screen 20 to descend uniform. The ideal rising speed and the ideal descending speed are a constant speed.

For example, the constant rising speed of the screen 20 conforms to the curve of the preset speed (as shown in FIG. 9). In this case, contents corresponding to regions with the height h4 may be added to optical images with content in images subsequently to be displayed, so that the regions corresponding to optical images with content in images subsequently to be displayed coincides or approximately coincides with the region where the unfolded portion of the screen 20 is located. Therefore, it may prevent the optical image with content from being projected on the second region beyond the first region where the unfolded portion of the screen 20 is located.

In some embodiments, when the screen is rising, the control assembly 30 removes a portion of each optical image with content in the at least one image to be displayed in the plurality of images to be displayed according to the current movement parameter, in response to determining that the current movement parameter is less than the preset movement parameter, so as to make at least one region corresponding to the reduced optical image with content in the at least one image to be displayed match the current unfolded portion of the screen 20. For example, the control assembly 30 removes the portion of the optical image with content in the current image to be displayed according to the height of the current unfolded portion of the screen 20, in response to determining that the current movement parameter is less than the preset movement parameter. A region corresponding to the removed portion is located on the bottom edge of the region corresponding to the optical image with content in the current image to be displayed. In this way, a region corresponding to the removed optical image with content in the current image to be displayed matches the height of the current unfolded portion of the screen 20.

Figure 2E:
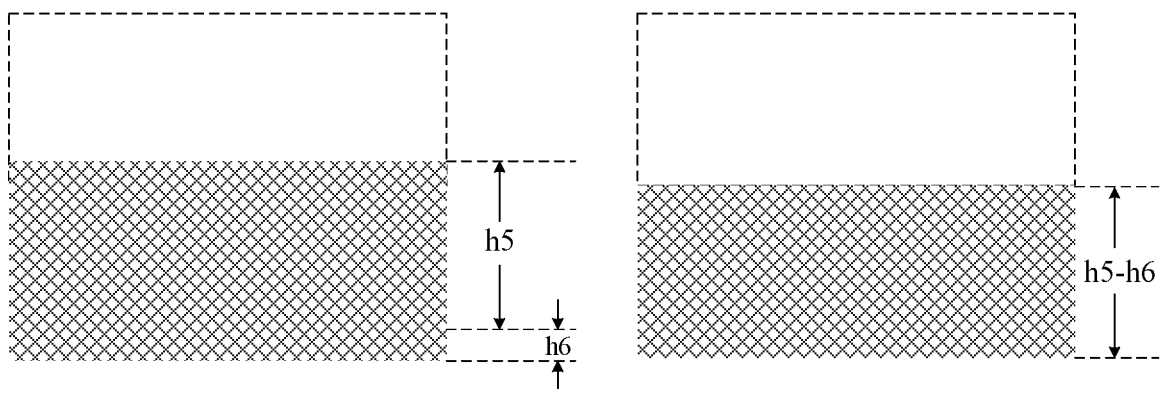
FIG. 2E is a schematic diagram showing another process of adjusting an image to be displayed, in accordance with some embodiments.

As shown in FIG. 2E, the width of the preset projection region corresponding to the optical image with content in the image to be displayed is h5, which matches the preset movement parameter of the screen 20 at the current height of the unfolded portion of the screen 20. If the current movement parameter of the screen 20 is less than the preset movement parameter of the screen 20, the height of the current unfolded portion of the screen 20 is less than the preset height of the unfolded portion of the screen 20, and the preset projection region corresponding to the optical image with content in the image to be displayed is greater than the region where the current unfolded portion of the screen 20 is located. That is, the region where the current unfolded portion of the screen 20 is located is less than the region corresponding to the optical image with content in the current image to be displayed. In this case, the control assembly 30 removes the portion of the region corresponding to the optical image with content in the image to be displayed, so that the region corresponding to the removed optical image with content in the image to be displayed matches the current unfolded portion of the screen 20. For example, since the height hc' of the current unfolded portion of the screen 20 is h5−h6 (i.e., hc'=h5+h6), the width of the region corresponding to the removed portion is h6. The width of the region corresponding to the removed optical image with content in the image to be displayed matches the height of the current unfolded portion of the screen 20. The top edge of the region corresponding to the removed optical content in the image to be displayed may coincide with the top edge of the region where the current unfolded portion of the screen 20 is located, and thus the region where the image is projected is less than or equal to the region where the current unfolded portion of the screen 20 is located.

For example, the constant rising speed of the screen 20 conforms to the curve of the preset speed (as shown in FIG. 9). In this case, portions corresponding to regions with the height h4 may be removed in optical images with content in images subsequently to be displayed, so that the regions corresponding to optical images with content in images subsequently to be displayed coincides or approximately coincides with the region where the unfolded portion of the screen 20 is located. Therefore, it may prevent the optical image with content from being projected on the second region beyond the first region where the unfolded portion of the screen 20 is located.

It will be noted that, the process of adding content to the optical image with content in the image to be displayed or removing portion of the optical image with content in the image to be displayed when the screen 20 descends can be referred to the process of adding content to the optical image with content in the image to be displayed or removing portion of the optical image with content in the image to be displayed when the screen 20 rises, and details will not be repeated here.

In some embodiments, the projection frequency of the plurality of images to be displayed is adjusted according to actual needs. For example, the preset projection frequency is 60 Hz, and the projection frequency is adjusted to 59 Hz or 62 Hz according to actual playback requirements. The frequency of projecting the plurality of images to be displayed may be in a range from 58 Hz to 63 Hz.

In some embodiments, the control assembly 30 is further configured to adjust the projection frequency of the plurality of images to be displayed according to the current movement parameter of the screen 20, so that the regions corresponding to the optical images with content in the plurality of images to be displayed match the current unfolded portion of the screen 20.

In some examples, the region corresponding to the optical image with content in the image to be displayed is gradually increased in the rising process of the screen 20. If the region corresponding to the optical image with content in the image to be displayed is greater than the region where the current unfolded portion of the screen 20 is located, the screen 20 rises slowly, and the current unfolded portion of the screen 20 is delayed to move to the region where the optical image with content of the current image to be displayed is projected. In this case, the projection frequency of the plurality of images to be displayed is reduced, so that the movement of the region where the optical image with content of the current image to be displayed is projected matches the movement of the current unfolded portion of the screen 20, and the region corresponding to the optical image with content in the image to be displayed may coincide with the current unfolded portion of the screen 20.

If the region corresponding to the optical image with content in the image to be displayed is less than the region where the current unfolded portion of the screen 20 is located, the screen 20 rises fast, and the current unfolded portion of the screen 20 moves in advance to the region where the optical image with content of the current image to be displayed is projected. In this case, the projection frequency of the plurality of images to be displayed is increased, so that the movement of the region where the optical image with content of the current image to be displayed is projected matches the movement of the current unfolded portion of the screen 20, and the region corresponding to the optical image with content in the image to be displayed may coincide with the current unfolded portion of the screen 20.

In some other examples, the region corresponding to the optical image with content in the image to be displayed is gradually decreased in the descending process of the screen 20. If the region corresponding to the optical image with content in the image to be displayed is greater than the region where the current unfolded portion of the screen 20 is located, the screen 20 descends fast, and the current unfolded portion of the screen 20 moves in advance to the region where the optical image with content of the current image to be displayed is projected. In this case, the projection frequency of the plurality of images to be displayed is increased, so that the movement of the region where the optical image with content of the current image to be displayed is projected matches the movement of the current unfolded portion of the screen 20, and the region corresponding to the optical image with content in the image to be displayed may coincide with the current unfolded portion of the screen 20.

If the region corresponding to the optical image with content in the image to be displayed is less than the region where the current unfolded portion of the screen 20 is located, the screen 20 descends slowly, and the current unfolded portion of the screen 20 is delayed to move to the region where the optical image with content of the current image to be displayed is projected. In this case, the projection frequency of the plurality of images to be displayed is reduced, so that the movement of the region where the optical image with content of the current image to be displayed is projected matches the movement of the current unfolded portion of the screen 20, and the region corresponding to the optical image with content in the image to be displayed may coincide with the current unfolded portion of the screen 20.

In some embodiments, the control assembly 30 is configured to obtain a current movement parameter of the screen 20, and select an image to be displayed that an optical image with content therein matches the current unfolded portion of the screen 20 to project according to the current movement parameter.

In some examples, the projection frequency of the plurality of images to be displayed is constant. In some other examples, the projection frequency of the plurality of images to be displayed is not constant. For example, the current image to be displayed is skipped according to the current movement parameter (e.g., the movement speed) of the screen 20, and the image to be displayed that the optical image with content therein matches the current unfolded portion of the screen 20 is selected according to the current movement parameter The selected image to be displayed may be an image before the current image to be displayed, or may be an image after the current image to be displayed in projection sequence. In addition, the selected image to be displayed may be repeatedly projected, so as to maintain a constant projection frequency of the plurality of images to be displayed.

Figure 3:
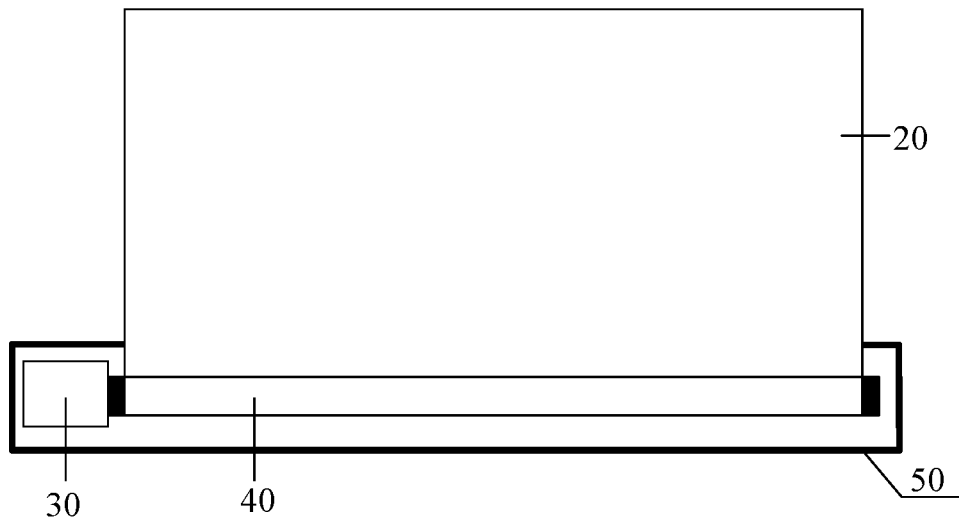
FIG. 3 is a schematic diagram showing a structure of another projection apparatus, in accordance with some embodiments.
Figure 4:
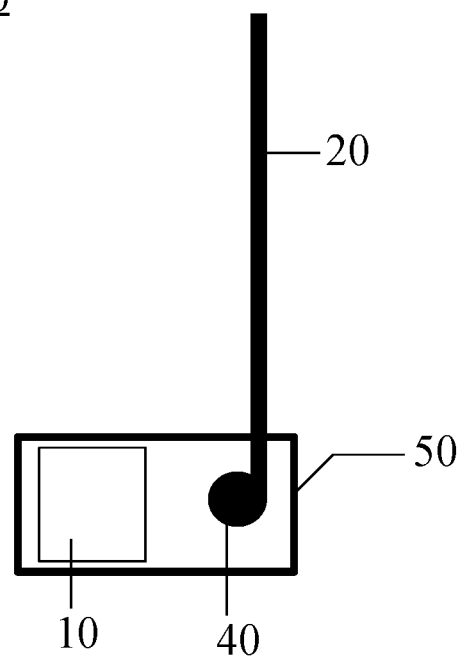
FIG. 4 is a schematic diagram showing a structure of yet another projection apparatus, in accordance with some embodiments.

FIG. 3 is a schematic diagram showing a structure of a projection apparatus provided in some embodiments of the present disclosure, and FIG. 4 is a side view of the projection apparatus as shown in FIG. 3. In some embodiments, as shown in FIGS. 3 and 4, the projection display structure 10, the control assembly 30 and the reel 40 are all arranged in the accommodating portion 50. In a case where the screen 20 is completely wound on the reel 40, the screen 20 is arranged in the accommodating portion 50. In this way, the space occupied by the screen 20 is reduced, and the space occupied by the projection apparatus 100 is further reduced.

In some embodiments, the preset movement parameter of the screen 20 is configured to indicate the current movement state of the screen 20 when the control assembly 30 controls the screen 20 to move at a constant speed.

The constant speed of the screen 20 is an ideal movement speed of the screen 20, and the preset movement parameter of the screen 20 may be obtained based on the ideal movement speed of the screen 20. For example, the preset movement parameter of the screen 20 is a ratio of an ideal height of the current unfolded portion of the screen 20 to the maximum height of the completely unfolded screen 20. The control assembly 30 may obtain the ideal current height of the unfolded screen 20 according to the ideal movement speed of the screen 20. For example, the current ideal height of the unfolded screen 20 is a product of the ideal movement speed of the screen 20 and a movement duration of the current unfolded portion of the screen 20.

In some embodiments, the screen 20 moves at the constant speed, and the preset movement parameter of the screen 20 is a ratio of the current movement duration of the screen 20 to a total movement duration in which the movement of the screen 20 is completed. For example, the screen 20 rises at the constant speed, and the preset movement parameter of the screen 20 is a ratio of the movement duration of the current unfolded portion of the screen 20 to the total movement duration of the completely unfolded screen 20.

It will be noted that, the total movement duration in which the movement of the screen 20 is completed is determined based on the ideal movement speed of the screen 20 and the maximum height of the unfolded screen 20. For example, the total movement duration in which the movement of the screen 20 is completed is a ratio of the maximum height of the unfolded screen 20 to the ideal movement speed of the screen 20.

In some embodiments, the current movement parameter of the screen 20 is configured to indicate a current movement process of the screen 20. It will be noted that, the movement speed of the screen 20 is non-uniform when the control assembly 30 controls the screen 20 to move normally.

In some embodiments, the control assembly 30 is further configured to obtain the current height of the unfolded screen 20 and the maximum height of the unfolded screen 20, and determine the current movement parameter of the screen 20 according to the height of the current unfolded portion of the screen 20 and the maximum height of the unfolded screen 20. For example, the current movement parameter of the screen 20 is the ratio of the height of the current unfolded portion of the screen 20 to the maximum height of the unfolded screen 20.

Figure 5:
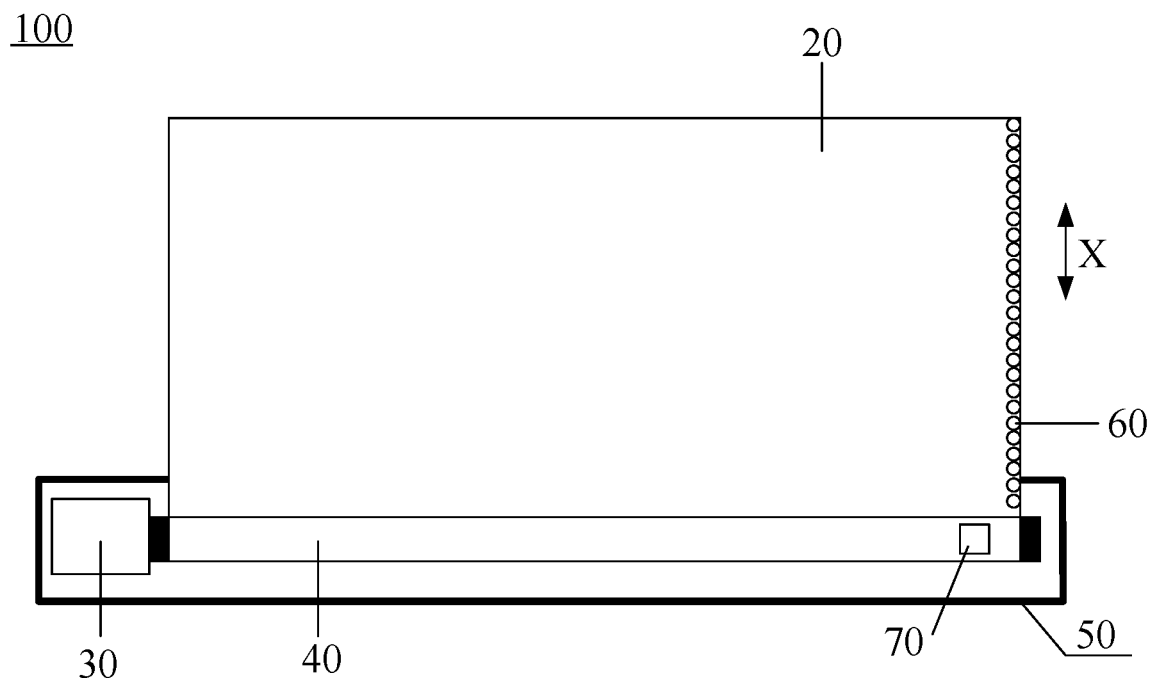
FIG. 5 is a schematic diagram showing a structure of yet another projection apparatus, in accordance with some embodiments.

FIG. 5 is a schematic diagram showing a structure of another projection apparatus provided in the embodiments of the present disclosure. In some embodiments, referring to FIG. 5, the projection apparatus 100 further includes a plurality of reference structures 60 and a detector 70. The reel 40 in the projection apparatus 100 is located in the accommodating portion 50 provided in the projection apparatus 100. The detector 70 is located on the reel 40; the plurality of reference structures 60 are located on an edge of the screen 20; and the detector 70 is opposite to the plurality of reference structures 60 when the screen 20 is wound on the reel 40. The plurality of reference structures 60 are arranged in sequence in a direction X in which the screen 20 moves. For example, the plurality of reference structures 60 are arranged at equal intervals. That is, a distance, in the direction X in which the screen 20 moves, between any two adjacent reference structures 60 is the same when the screen 20 is completely unfolded.

The detector 70 is configured to detect the number of the reference structure(s) 60 exposed outside the accommodating portion 50, and send the number of the reference structure(s) 60 exposed outside the accommodating portion 50 to the control assembly 30. The control assembly 30 is further configured to determine the number of reference structure(s) 60 currently exposed outside the accommodating portion 50, so as to determine the height of the current unfolded portion of the screen 20.

Figure 6:
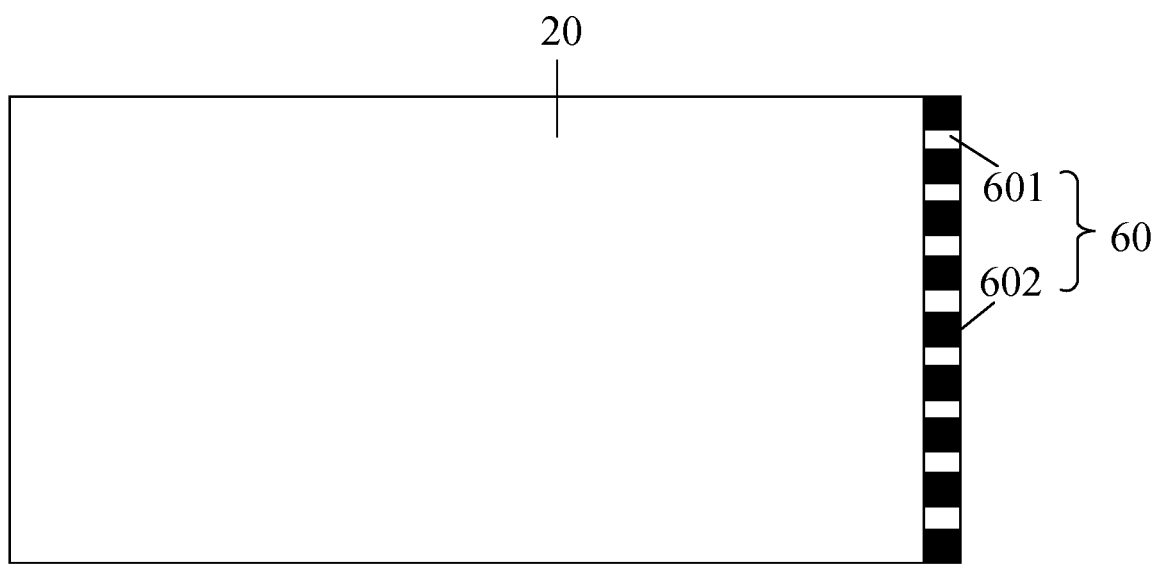
FIG. 6 is a schematic diagram showing a completely unfolded screen, in accordance with some embodiments.

FIG. 6 illustrates the completely unfolded screen 20. In some embodiments, referring to FIG. 6, the plurality of reference structures 60 on the edge of the screen 20 include first reference structure(s) 601 and second reference structure(s) 602. The first reference structure 601 and the second reference structure 602 are alternately arranged. A reflectivity of the first reference structure 601 and a reflectivity of the second reference structure 602 are different. The first reference structure 601 and the second reference structure 602 may be reflective patterns with different reflectivities. For example, the first reference structure 601 may be a white reflective pattern, and the second reference structure 602 may be a black reflective pattern.

In this case, the detector 70 is configured to: emit detection light to the plurality of reference structures 60; receive reflected detection light from the plurality of reference structures 60; generate a detection square wave signal based on the reflected detection light from the plurality of reference structures 60; and determine the number of the first reference structure(s) 601 and the number of the second reference structure(s) 602 exposed outside the accommodating portion 50 according to the detection square wave signal. The detector 70 may adopt a light sensor used to emit and receive light.

Since reflectivities of the first reference structure 601 and the second reference structure 602 are different, the intensity of the reflected detection light from the first reference structure 601 and the intensity of the reflected detection light from the second reference structure 602 are different. Therefore, the detector 70 generates the detection square wave signal based on the reflected detection light from the first reference structure 601 and the second reference structure 602, the detection square wave signal includes a first level signal and a second level signal that are spaced apart, the first level signal is related to the reflected detection light from the first reference structure 601, the second level signal is related to the reflected detection light from the second reference structure 602, and a level of the first level signal is different from a level of the second level signal. For example, the reflectivity of the first reference structure 601 is greater than the reflectivity of the second reference structure 602, and the level of the first level signal is greater than the level of the second level signal. For another example, the reflectivity of the first reference structure 601 is less than the reflectivity of the second reference structure 602, and the level of the first level signal is less than the level of the second level signal.

In some examples, there is no gap between the first reference structure 601 and the second reference structure 602 that are adjacent. In this case, the control assembly 30 may obtain the height of the current unfolded portion of the screen 20 based on the number of the first reference structure(s) 601 and the number of the second reference structure(s) 602, a dimension of the first reference structure 601 in the direction X in which the screen 20 moves, and a dimension of the second reference structure 602 in the direction X in which the screen 20 moves.

In some examples, the control assembly 30 obtains the height of the current unfolded screen 20 according to a first formula: $h_0 = n \times L_1 + m \times L_2$. Here, $h_0$ represents the height of the current unfolded screen 20; n represents the number of the first reference structure(s) 601 exposed outside the accommodating portion 50; $L_1$ represents the dimension of the first reference structure 601 in the direction in which the screen 20 moves; m represents the number of the second reference structure(s) 602 exposed outside the accommodating portion 50; and $L_2$ represents the dimension of the second reference structure 602 in the direction in which the screen 20 moves. For example, n is equal to m (i.e., n=m). For another example, n is equal to a sum of m and 1 (i.e., n=m+1). For yet another example, n is equal to a difference between m and 1 (i.e., n=m−1).

Figure 7:
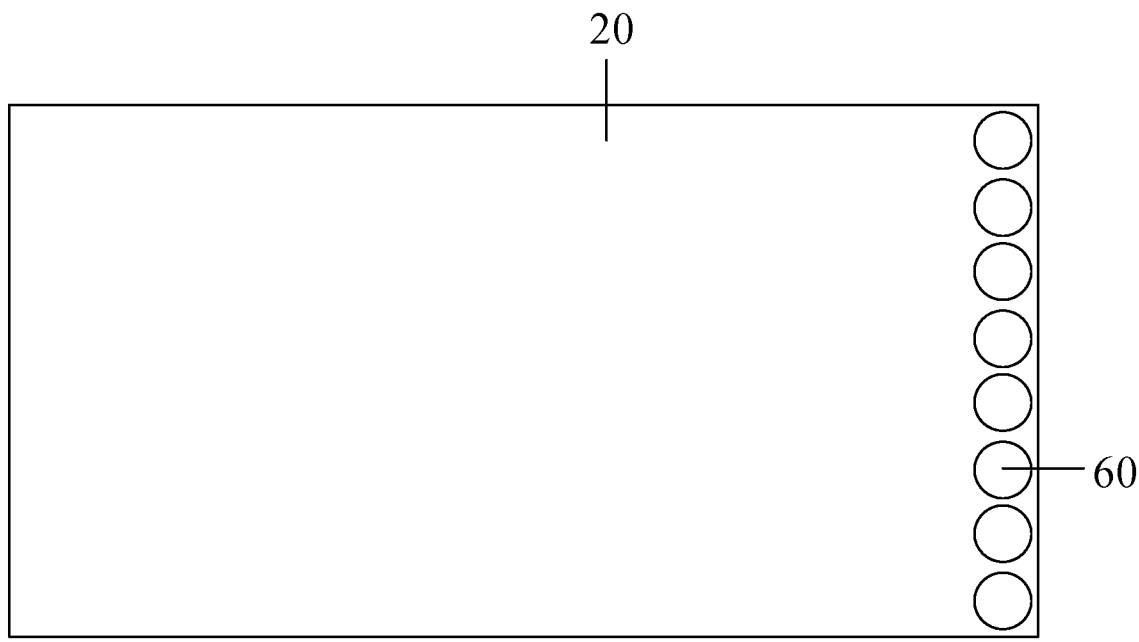
FIG. 7 is a schematic diagram showing another completely unfolded screen, in accordance with some embodiments.

FIG. 7 is a schematic diagram showing another completely unfolded screen provided in some embodiments of the present disclosure. In some embodiments, referring to FIG. 7, the plurality of reference structures 60 on the edge of the screen 20 is a plurality of sensors. The plurality of sensors are connected to the detector 70. For example, each sensor is in a wireless communication connection with the detector 70.

In this case, the sensor is configured to send a position signal to the detector 70. The detector 70 is further configured to determine the number of sensor(s) exposed outside the accommodating portion 50 based on the received position signal(s), and send the number of sensor(s) exposed outside the accommodating portion 50 to the control assembly 30.

The distance between any two adjacent sensors is the same, and therefore the control assembly 30 may obtain the height of the current unfolded portion of the screen 20 based on the number of sensors exposed outside the accommodating portion 50, a dimension of the sensor in the direction in which the screen 20 moves, and a distance between the two adjacent sensors in the direction in which the screen 20 moves.

In some examples, the control assembly 30 obtains the height of the current unfolded portion of the screen 20 according to a second formula: $h_0 = k \times L_3 + (k-1) \times L_4$. Here, $h_0$ represents the current width of the unfolded screen 20; k represents the number of sensor(s) exposed outside the accommodating portion 50; $L_3$ represents the dimension of the sensor in the direction in which the screen 20 moves; and $L_4$ represents the distance between the two adjacent sensors in the direction in which the screen 20 moves.

Figure 8:
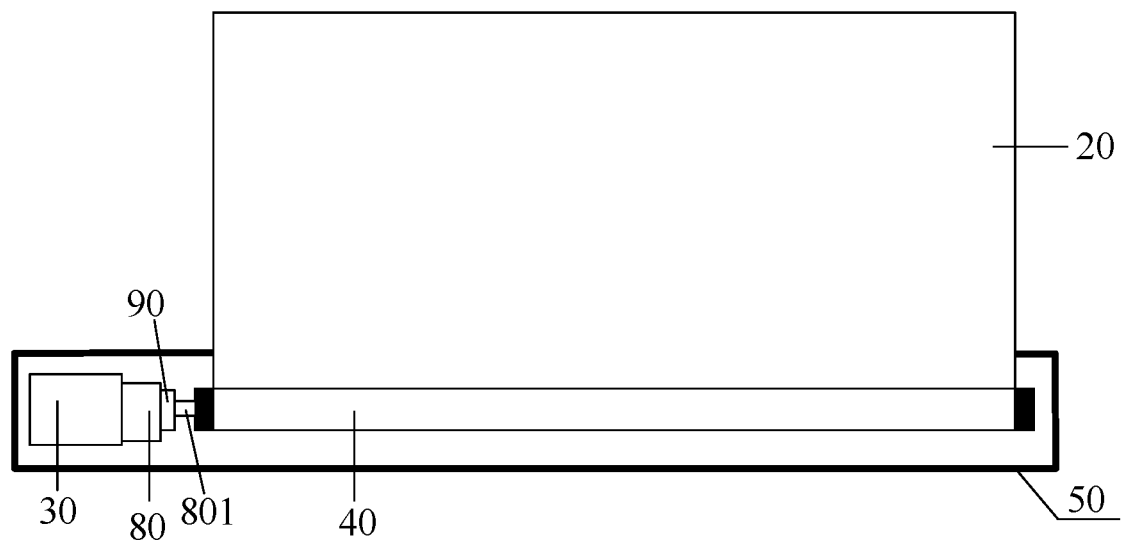
FIG. 8 is a schematic diagram showing a structure of yet another projection apparatus, in accordance with some embodiments.

FIG. 8 is a schematic diagram showing a structure of yet another projection apparatus provided in some embodiments of the present disclosure. In some embodiments, referring to FIG. 8, the motor 80 included in the projection apparatus has a transmission shaft 801. The control assembly 30 in the projection apparatus 100 is connected to the motor 80, and the transmission shaft 801 in the motor 80 is connected to the reel 40. The control assembly 30 is further configured to control the transmission shaft 801 in the motor 80 to rotate. In this way, the transmission shaft 801 in the motor 80 drives the reel 40 to rotate, and the reel 40 drives the screen 20 to move.

In some examples, the motor 80 is a stepping motor. The stepping motor refers to a motor that drives the transmission shaft 801 to rotate step by step according to a fixed angle (i.e., a stepping angle). For example, the stepping angle of the stepping motor is 7.5°, and the transmission shaft 801 performs 48 (that is, 360°/7.5°=48) stepping angles when the stepping motor drives the transmission shaft 801 to rotate one turn (i.e., rotate for 360°).

In this case, the control assembly 30 may set the current movement parameter of the screen 20 as a ratio of the number of stepping angles currently performed by the transmission shaft 801 to the number of stepping angles performed by the transmission shaft 801 during a process when the completely unfolded screen 20 becomes the completely folded screen 20 or a process when the completely folded screen 20 becomes the completely unfolded screen 20.

In some embodiments, as shown in FIG. 8, the projection apparatus further includes a pulse encoder 90. The control assembly 30 in the projection apparatus 100 is further connected to the pulse encoder 90, and the pulse encoder 90 is further connected to the transmission shaft 801 in the motor 80. For example, the pulse encoder 90 is sleeved on the transmission shaft 801, so that the pulse encoder 90 detects the number of stepping angles performed by the transmission shaft 801 when the transmission shaft 801 is rotating and generate a pulse signal. In this case, a pulse equivalent of the pulse signal is used to represent the number of stepping angles performed by the transmission shaft 801.

For example, the pulse encoder 90 is configured to generate a first pulse signal according to the number of stepping angles currently performed by the transmission shaft 801. The control assembly 30 is further configured to obtain a pulse equivalent of the first pulse signal and a pulse equivalent of a second pulse signal; and determine the current movement parameter of the screen 20 according to the pulse equivalent of the first pulse signal and the pulse equivalent of the second pulse signal. The current movement parameter of the screen 20 is a ratio of the pulse equivalent of the first pulse signal to the pulse equivalent of the second pulse signal. The second pulse signal is configured to represent the number of stepping angles performed by the transmission shaft 801 of the motor 80 during the process when the completely unfolded screen 20 becomes the completely folded screen 20 or the process when the completely folded screen 20 becomes the completely unfolded screen 20. The second pulse signal may be generated by the pulse encoder 90.

The pulse equivalent of the pulse signal generated by the pulse encoder 90 may be fixed when the transmission shaft 801 of the motor 80 rotates one turn.

For example, when the transmission shaft 801 of the motor 80 rotates one turn, the pulse equivalent of the pulse signal generated by the pulse encoder 90 is 360 degrees, and the stepping angle of the motor 80 is 7.5 degrees. The pulse equivalent p of the pulse signal and the number of stepping angles q performed by the transmission shaft 801 satisfies a formula: $p = 7.5 \times q$. The number of stepping angles performed by the transmission shaft 801 during the process when the completely unfolded screen 20 becomes the completely folded screen 20 or the process when the completely folded screen 20 becomes the completely unfolded screen 20 may be obtained according to the maximum height of the unfolded screen 20, and thus the pulse equivalent of the second pulse signal is calculated through the above formula according to the number of stepping angles performed by the transmission shaft 801 during the process when the completely unfolded screen 20 becomes the completely folded screen 20 or the process when the completely folded screen 20 becomes the completely unfolded screen 20.

It will be noted that, the control assembly 30 can obtain the preset movement parameter of the screen 20 and the current movement parameter of the screen 20 simultaneously.

In a case where the projection display structure 10 projects the plurality of images to be displayed at the preset fixed frequency, the control assembly 30 controls the actual movement of the screen 20 according to the obtained current movement parameter of the screen 20 and the preset movement parameter of the screen 20, so as to make the current movement parameter of the screen 20 approximately equal to the preset movement parameter of the screen 20. In this way, the current unfolded portion of the screen 20 has a good matching relationship with the image to be displayed that is currently projected.

For example, after the control assembly 30 obtains the preset movement parameter of the screen 20 and the current movement parameter of the screen 20 simultaneously, if the control assembly 30 determines that the current movement parameter of the screen 20 is equal to the preset movement parameter of the screen 20, the control assembly 30 does not adjust the movement of the screen 20; and if the control assembly 30 determines that the current movement parameter of the screen 20 is not equal to the preset movement parameter of the screen 20, the control assembly 30 adjusts the current movement parameter (e.g., the movement speed) of the screen 20 of the screen 20, so as to adjust the movement of the screen 20.

During the rising process of the screen 20, if the control assembly 30 determines that the current movement parameter of the screen 20 is greater than the preset movement parameter of the screen 20, and the screen 20 rises fast, the control assembly 30 controls the movement (i.e., rising) speed of the screen 20 to be reduced; and if the control assembly 30 determines that the current movement parameter of the screen 20 is less than the preset movement parameter of the screen 20, and the screen rises slowly, the control assembly 30 controls the movement (i.e., rising) speed of the screen 20 to be increased. During the descending process of the screen 20, if the control assembly 30 determines that the current movement parameter of the screen 20 is less than the preset movement parameter of the screen 20, and the screen 20 descends slowly, the control assembly 30 controls the movement speed of the screen 20 (i.e., descending) to be increased; and if the control assembly 30 determines that the current movement parameter of the screen 20 is greater than the preset movement parameter of the screen 20, and the screen 20 descends fast, the control assembly 30 controls the movement (i.e., descending) speed of the screen 20 to be decreased.

In some embodiments, the control assembly 30 in the projection apparatus 100 adjusts the movement speed of the screen 20 by controlling the rotation speed of the transmission shaft 801 in the motor 80. For example, the control assembly 30 sends a control signal to the motor 80 to reduce the rotation speed of the transmission shaft 801, so as to reduce the movement (i.e., rising or descending) speed of the screen 20; the control assembly 30 sends a control signal to the motor 80 to increase the rotation speed of the transmission shaft 801, so as to increase the movement speed of the screen 20. In a case where the motor 80 is the stepping motor, the stepping motor is an open-loop control motor that converts an electric pulse signal into an angular displacement, and the rotation speed of the transmission shaft 801 is positively correlated with the frequency of the electric pulse signal output by the stepping motor. Therefore, the control assembly 30 may control a frequency of the electric pulse signal output by the stepping motor, so as to control the rotation speed of the transmission shaft 801.

Since the transmission shaft 801 of the motor 80 may lose steps or stop turning during the rotation, the movement speed of the screen 20 driven by the motor 80 may be non-uniform. The control assembly 30 may periodically and simultaneously obtains the preset movement parameter of the screen 20 and the current movement parameter of the screen 20. In a case where a period of obtaining the preset movement parameter of the screen 20 and the current movement parameter of the screen 20 simultaneously is small enough, by adjusting the movement speed of the screen 20, the region corresponding to the optical image with content coincides or approximately coincides with the region where the unfolded portion of the screen 20 is located. In this way, the display effect of the image projected onto the screen 20 during the movement process of the screen 20 is improved.

In some embodiments, the projection display structure 10 obtains the current movement parameter of the screen 20, and adjusts the content of the image to be displayed that is currently projected based on the current movement parameter of the screen 20.

In some examples, referring to FIG. 2C, the projection display structure 10 is further configured to: determine the number of pixel rows in the optical image with content in the current image to be displayed in the area 01 (i.e., the first region) according to the current movement parameter of the screen 10 and the total number of pixel rows in the current image to be displayed; and adjust the region where the optical image with content in the current image to be displayed is projected according to the number of pixel rows in the optical image with content in the current image to be displayed in the area 01.

In some embodiments, the current movement parameter of the screen 20 is MA, and the total number of pixel rows in the current image to be displayed is DT, and the number DS of pixel rows in the region corresponding to the optical image with content in the current image to be displayed satisfies a formula: $MA=DS/DT$. That is, a product of the current movement parameter of the screen 20 and the total number of pixel rows in the current image to be displayed is the number of pixel rows in the region corresponding to the optical image with content in the current image to be displayed.

Figure 11:
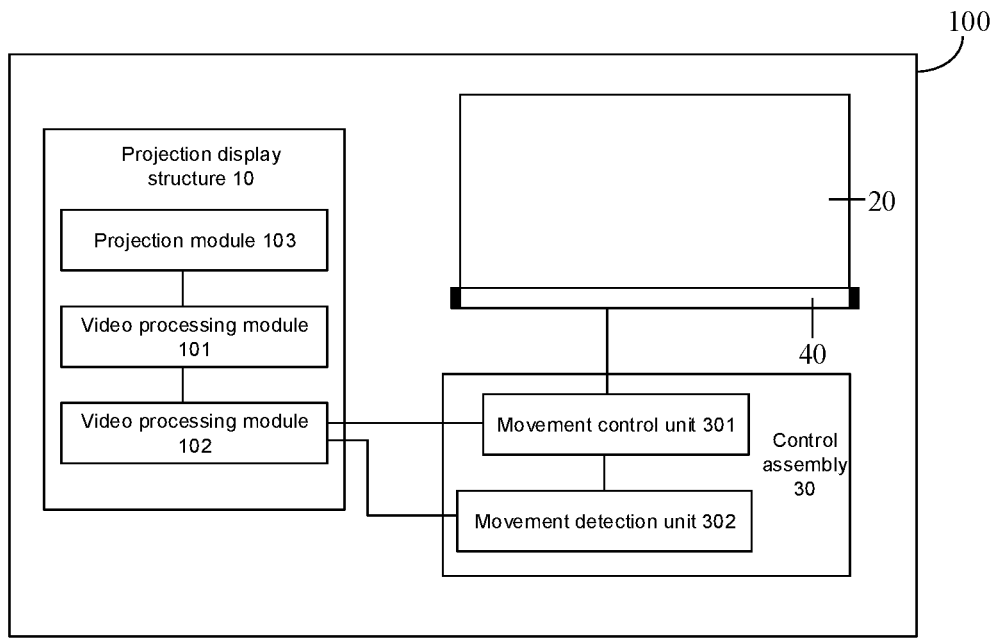
FIG. 11 is a block diagram showing another projection apparatus, in accordance with some embodiments.

In some embodiments, as shown in FIG. 11, the projection display structure 10 in the projection apparatus 100 includes a video processing module (e.g., a video processor) 101, a video control module (e.g., a video controller) 102 and a projection module 103. The video processing module 101 is connected to the video control module 102 and the projection module 103. The control assembly 30 includes a movement control unit (e.g., a movement controller) 301 and a movement detection unit (e.g., a movement detector) 302. The movement control unit 301 is connected to the movement detection unit 302, and the movement control unit 301 is further connected to the video control module 102. The movement detection unit 302 is connected to the video control module 102.

The movement control unit 301 is configured to control the screen 20 to move.

The movement detection unit 302 is configured to obtain the current movement parameter of the screen 20, and send the current movement parameter to the video control module 102 and the movement control unit 301.

The video control module 102 is configured to obtain the number of pixel rows corresponding to an optical image with content in a current image to be displayed according to the current movement parameter of the screen 20, and send the number of pixel rows corresponding to the optical image with content in the current image to be displayed to the video processing module 101.

The video processing module 101 is configured to process the current image to be displayed according to the number of rows of pixels corresponding to the optical image with content in the current image to be displayed, and send the processed current image to be displayed to the projection module 103.

The projection module 103 is configured to project the processed current image to be displayed onto the screen 20.

The movement control unit 301 is further configured to obtain the current movement parameter of the screen 20 and the preset movement parameter of the screen 20, and adjust the movement speed of the screen 20 in response to determining that the current movement parameter of the screen 20 and the preset movement parameter of the screen 20 are not the same.

Some embodiments of the present disclosure provide a control method of the projection apparatus.

The control method is applied to the projection apparatus 100 in any of the above embodiments. Referring to FIG. 10, the projection apparatus 100 includes the projection display structure 10, the screen 20, the control assembly 30 and the reel 40. The control method is executed at the control assembly 30 in the projection apparatus 100.

Figure 12:
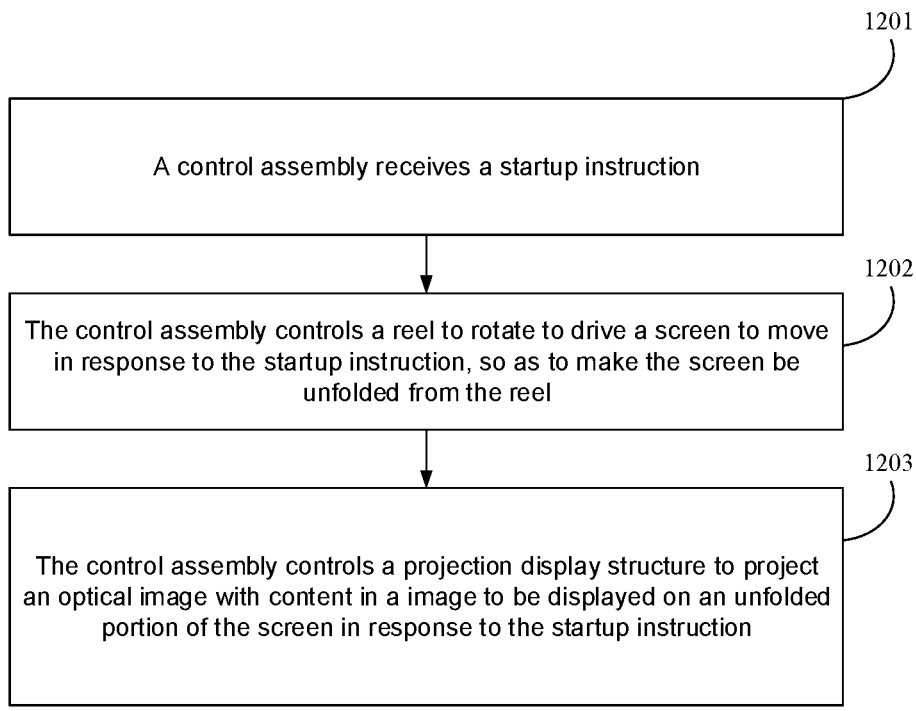
FIG. 12 is a flow diagram of a control method of a projection apparatus, in accordance with some embodiments.

As shown in FIG. 12, the control method includes steps 1201 to 1203.

In step 1201, the control assembly 30 receives a startup instruction.

For example, the startup instruction may be sent by a remote control.

In step 1202, the control assembly 30 controls the reel 40 to rotate to drive the screen 20 to move in response to the startup instruction, so as to make the screen 20 be unfolded from the reel 40.

Before the control assembly 30 receives the startup instruction, the screen 20 is wound on the reel 40. After the control assembly receives the startup instruction, the control assembly 30 controls the reel 40 to rotate in response to the startup instruction, and the reel 40 drives the screen 20 to be gradually unfolded from the reel 40. In this case, the screen 20 is in the rising state.

In some examples, the projection apparatus 100 further includes a driving structure (e.g., the motor 80 shown in FIG. 8). The control assembly 30 controls the driving structure to work in response to the startup instruction. For example, after the driving structure is powered on, the control assembly 30 reads driving data and controls the operation of the driving structure. In this way, the driving structure drives the reel 40 to rotate, so as to drive the screen 20 to move.

In step 1203, the control assembly 30 controls the projection display structure 10 to project the optical image with content in the image to be displayed on the unfolded portion of the screen 20, in response to the startup instruction.

A region corresponding to the optical image with content increases as a height of the unfolded portion of the screen 20 increases.

For example, the control assembly 30 activates the projection display structure 10 in response to the startup instruction, and controls the projection display structure 10 to project the image beam corresponding to the optical image with content onto the unfolded portion of the screen 20.

In addition, the control assembly 30 may further control the projection display structure 10 not to project the image beam to the second region beyond the first region where the unfolded portion of the screen 20 is located; or the control assembly 30 may further control the projection display structure 10 to project the image beam of the optical image without content in the image to be displayed to the second region beyond the first region where the unfolded portion of the screen 20 is located.

The projection display structure 10 projects the plurality of images to be displayed on the screen 20. In the process when the screen 20 rises, regions corresponding to optical images with content in at least two images to be displayed are different, and contents displayed in regions corresponding to optical images with content in the at least two images to be displayed are different. The plurality of images to be displayed may constitute a video or an animated image.

The region corresponding to the optical image with content matches the region where the unfolded portion of the screen 20 is located, and the region corresponding to the optical image with content increases as the unfolded portion of the screen 20 increases. For example, the pixel values of pixels in the optical image without content in the image to be displayed are the preset value. The optical image without content may be an image of a mono-color or a pure color. For another example, the pixel values of pixels in the optical image without content in the image to be displayed are zero. In this case, when projecting the image to be displayed, no image beam will be projected on the second region, or the image beam corresponding to the optical image without content is projected on the second region.

It will be understood that, the projection apparatus 100 starts to work after the projection display structure 10, the control assembly 30, and the reel 40 are started up.

Some embodiments of the present disclosure provide another control method of the projection apparatus. The control method is applied to the projection apparatus 100 in any of the above embodiments. Referring to FIG. 10, the projection apparatus 100 includes the projection display structure 10, the screen 20, the control assembly 30 and the reel 40. The control method is executed at the control assembly 30 in the projection apparatus 100. The control assembly 30 is configured with the preset movement parameter of the screen 20.

Figure 13:
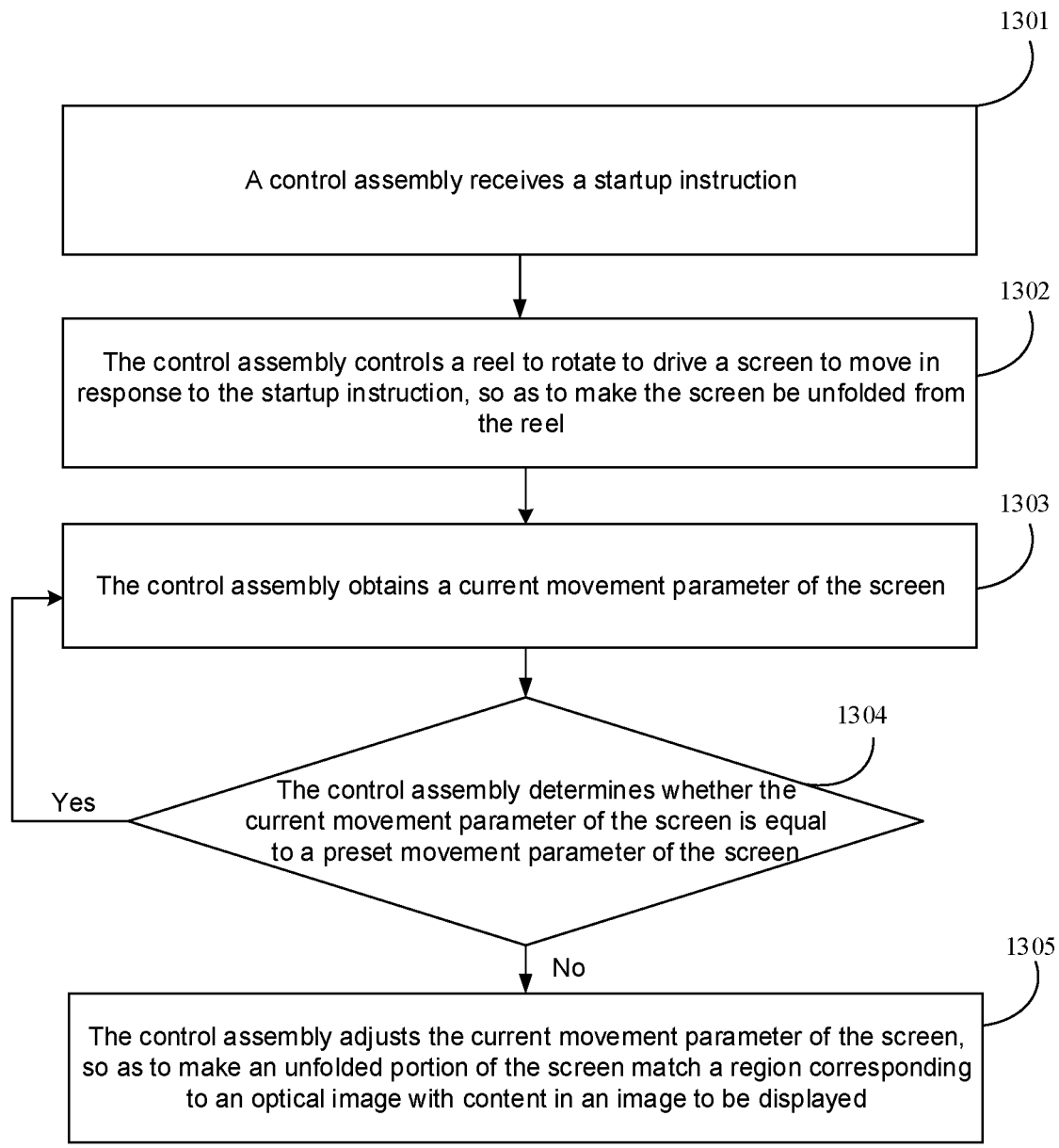
FIG. 13 is a flow diagram of another control method of a projection apparatus, in accordance with some embodiments.

As shown in FIG. 13, the control method includes steps 1301 to 1305.

In step 1301, the control assembly 30 receives a startup instruction.

In step 1302, the control assembly 30 controls the reel 40 to rotate to drive the screen 20 to move in response to the startup instruction, so that the screen 20 is unfolded from the reel 40.

The steps 1301 and 1302 can be referred to the description of the steps 1201 and 1202 in the above embodiments, and details will not be repeated here.

In step 1303, the control assembly 30 obtains a current movement parameter of the screen 20.

The process of obtaining the current movement parameter of the screen 20 can be referred to the corresponding description in the above embodiments/examples, and will not be repeated here.

In step 1304, the control assembly 30 determines whether the current movement parameter of the screen 20 is equal to the preset movement parameter of the screen 20.

In step 1305, the control assembly 30 adjusts the current movement parameter of the screen 20 in response to determining that the current movement parameter of the screen 20 is not equal to the preset movement parameter of the screen 20, so as to make an unfolded portion of the screen 20 match a region corresponding to an optical image with content in an image to be displayed.

The height of the unfolded portion of the screen 20 may match the region corresponding to the adjusted optical image with content in the image to be displayed.

In addition, if the current movement parameter of the screen 20 is equal to the preset movement parameter of the screen 20, the control assembly 30 performs step 1303 again.

For example, the control assembly 30 adjusts a current movement speed of the screen 20 according to the movement speed curves of the screen 20 shown in FIG. 9 or 10, so as to adjust the current movement parameter of the screen 20. The adjustment of the current movement parameter of the screen 20 can be referred to the corresponding description of the above embodiments/examples, and will not be repeated here. By adjusting the current movement parameter of the screen 20, the unfolded portion of the screen 20 has a good matching relationship with the region corresponding to the optical image with content. For example, the region where the unfolded portion of the screen 20 is located coincides with the region corresponding to the optical image with content. The width of the region corresponding to the optical image with content may match the height of the unfolded portion of the screen 20.

In this case, the projection display structure maintains a fixed frequency to project optical images with content on the unfolded portion of the screen 20.

For example, the projection display structure 10 projects the images to be displayed on the screen 20 at the fixed frequency, and the optical images with content displayed on the screen 20 are refreshed at the fixed frequency.

Moreover, the region corresponding to the optical image with content increases as the height of the unfolded portion of the screen 20 increases. The control assembly 30 may control the projection display structure 10 not to project the optical image on the second region beyond the first region where the unfolded portion of the screen 20 is located, or project the optical image without content on the second region beyond the first region where the unfolded portion of the screen 20 is located.

In addition, if the current movement parameter of the screen 20 is equal to the preset movement parameter of the screen 20, the control assembly 30 performs step 1303 again. The control assembly 30 does not adjust the current movement parameter of the screen 20.

Figure 14:
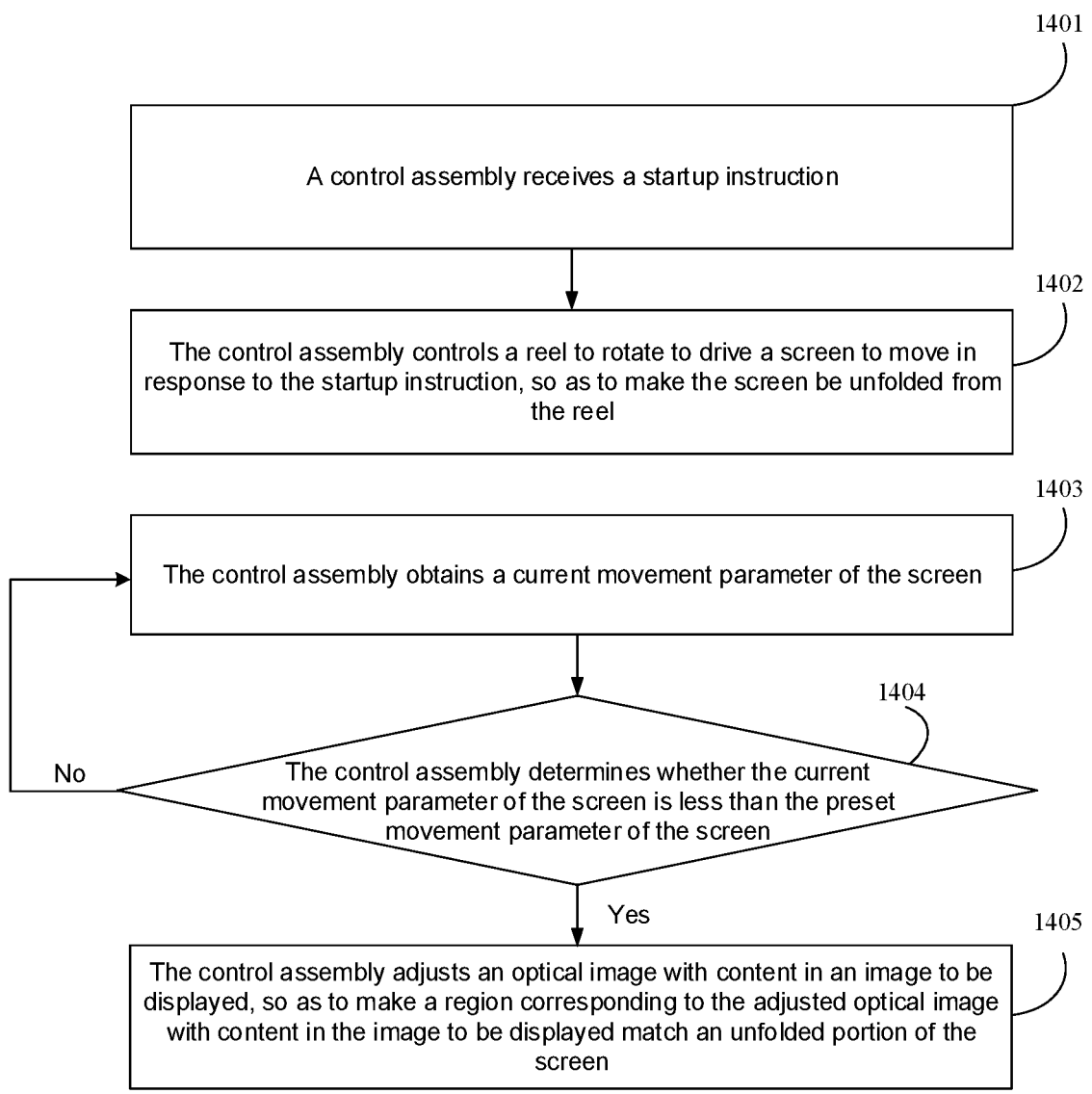
FIG. 14 is a flow diagram of yet another control method of a projection apparatus, in accordance with some embodiments.

Some embodiments of the present disclosure provide yet another control method of the projection apparatus. The control method is applied to the projection apparatus 100 in any of the above embodiments. Referring to FIG. 10, the projection apparatus 100 includes the projection display structure 10, the screen 20, the control assembly 30 and the reel 40. The control method is executed at the control assembly 30. The control assembly 30 is configured with the preset movement parameter of the screen 20. As shown in FIG. 14, the control method includes steps 1401 to 1406.

In step 1401, the control assembly 30 receives a startup instruction.

In step 1402, the control assembly 30 controls the reel 40 to rotate to drive the screen 20 to move in response to the startup instruction, so that the screen 20 is unfolded from the reel 40.

In step 1403, the control assembly 30 obtains a current movement parameter of the screen 20.

In step 1404, the control assembly 30 determines whether the current movement parameter of the screen 20 is less than the preset movement parameter of the screen 20.

In step 1405, the control assembly 30 adjusts an optical image with content in an image to be displayed in response to determining that the current movement parameter of the screen 20 is less than the preset movement parameter of the screen 20, so as to make a region corresponding to the adjusted optical image with content in the image to be displayed match an unfolded portion of the screen 20.

For example, the region corresponding to the adjusted optical image with content in the image to be displayed matches the height of the unfolded portion of the screen 20.

In addition, if the current movement parameter of the screen 20 is equal to or greater than the preset movement parameter of the screen 20, the control assembly 30 performs step 1403 again. The control assembly 30 does not adjust the optical image with content.

The projection display structure 10 projects optical images with content at a fixed frequency.

For example, the current movement parameter of the screen 20 is a height of the current unfolded portion of screen 20, and the preset movement parameter of the screen 20 is a preset height of the unfolded portion of screen 20. If the screen 20 rises slowly, the current height of the unfolded screen 20 is less than the preset height of the unfolded screen 20. In this case, the control assembly 30 removes a portion of the region corresponding to the optical image with content in the image to be displayed, so that the region corresponding to the removed optical image with content in the image to be displayed matches the current unfolded portion of the screen 20. There is at least one pixel row in the removed portion. In this way, the width of the region corresponding to the optical image with content is reduced, so that the width of the region corresponding to the removed optical image with content matches the height of the current unfolded portion of the screen 20. The process of removing can be referred to the description of the above embodiments/examples, which will not be repeated here.

If the screen 20 rises fast, the current height of the unfolded portion of the screen 20 is greater than or equal to the preset height of the screen 20, and the optical image with content may not be adjusted. In this case, a region where the unfolded portion of the screen 20 is located may be greater than or equal to a region where the image beam of the optical image with content projected.

The projection display structure 10 projects optical images with content at the fixed frequency. The region corresponding to the optical image with content increases as the height of the unfolded portion of the screen 20 increases. The control assembly 30 may control the projection display structure 10 not to project the optical image on the second region beyond the first region where the unfolded portion of the screen 20 is located, or project the optical image without content on the second region beyond the first region where the unfolded portion of the screen 20 is located.

Some embodiments of the present disclosure provide yet another control method of the projection apparatus. The control method is applied to the projection apparatus 100 in any of the above embodiments. Referring to FIG. 10, the projection apparatus 100 includes the projection display structure 10, the screen 20, the control assembly 30 and the reel 40. The control method is executed at the control assembly 30.

Figure 15:
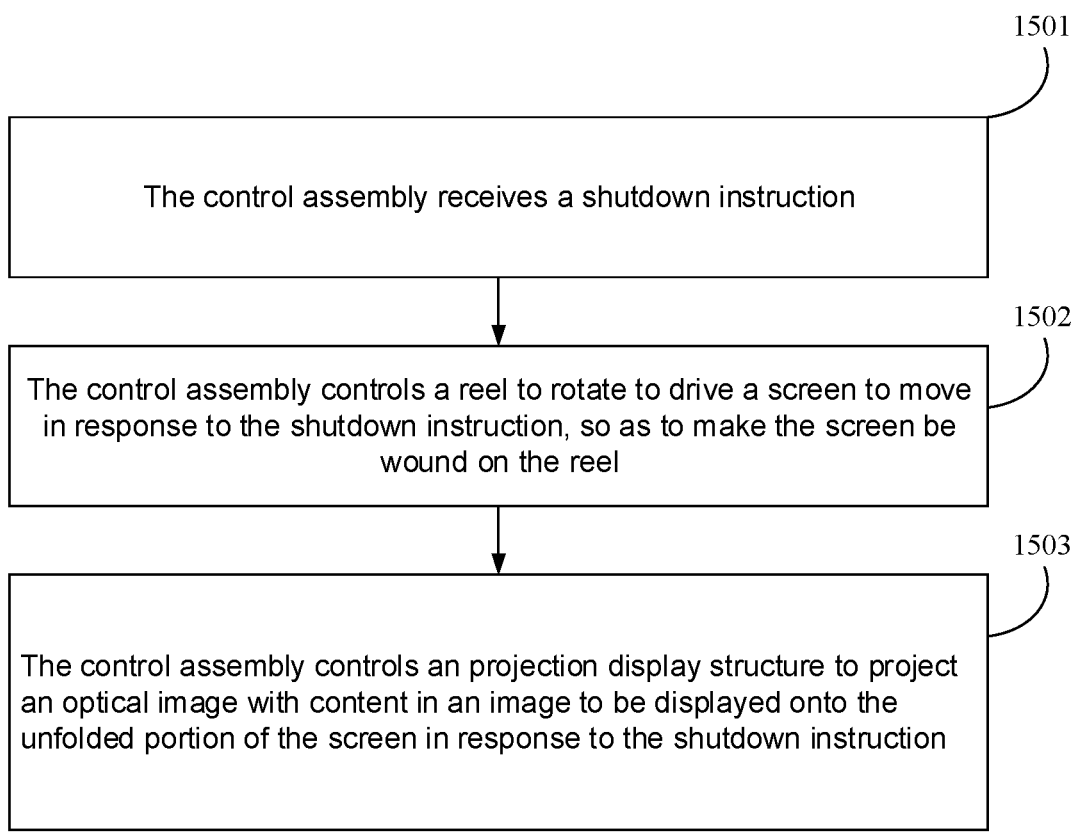
FIG. 15 is a flow diagram of yet another control method of a projection apparatus, in accordance with some embodiments.

As shown in FIG. 15, the control method includes steps 1501 to 1503.

In step 1501, the control assembly 30 receives a shutdown instruction.

The shutdown instruction may be sent by a remote control.

In step 1502, the control assembly 30 controls the reel 40 to rotate to drive the screen 20 to move in response to the shutdown instruction, so as to make the screen 20 be wound on the reel 40.

Before the control assembly 30 receives a shutdown instruction, the screen is completely unfolded. After the control assembly 30 receives the shutdown instruction, the control assembly 30 controls the reel 40 to rotate in response to the shutdown instruction, and the reel 40 drives the screen 20 to be wound on the reel 40. In this case, the screen 20 is in a descending state.

In step 1503, the control assembly 30 controls the projection display structure 10 to project an optical image with content in an image to be displayed onto an unfolded portion of the screen 20, in response to the shutdown instruction.

The region corresponding to the optical image with content decreases as the height of the unfolded portion of the screen 20 decreases.

The description of the region corresponding to the optical image with content can be referred to the above embodiments/examples, and details will not be repeated here.

In a process when the screen 20 is descending, the height of the unfolded portion of the screen 20 gradually decreases. The image beam of the portion of optical image with content is projected on the unfolded portion of the screen 20, and thus the region corresponding to the optical image with content is reduced. In this case, the image displayed on the screen 20 appears to be pulled down in a direction in which the screen 20 descends.

In addition, the control assembly 30 may control the projection display structure 10 not to project the optical image on the second region beyond the first region where the unfolded portion of the screen 20 is located, or project the optical image without content on the second region beyond the first region where the unfolded portion of the screen 20 is located.

Some embodiments of the present disclosure provide yet another control method of the projection apparatus. The control method is applied to the projection apparatus 100 in any of the above embodiments. Referring to FIG. 10, the projection apparatus 100 includes the projection display structure 10, the screen 20, the control assembly 30 and the reel 40. The control method is executed at the control assembly 30. The control assembly 30 is configured with the preset movement parameter of the screen 20.

Figure 16:
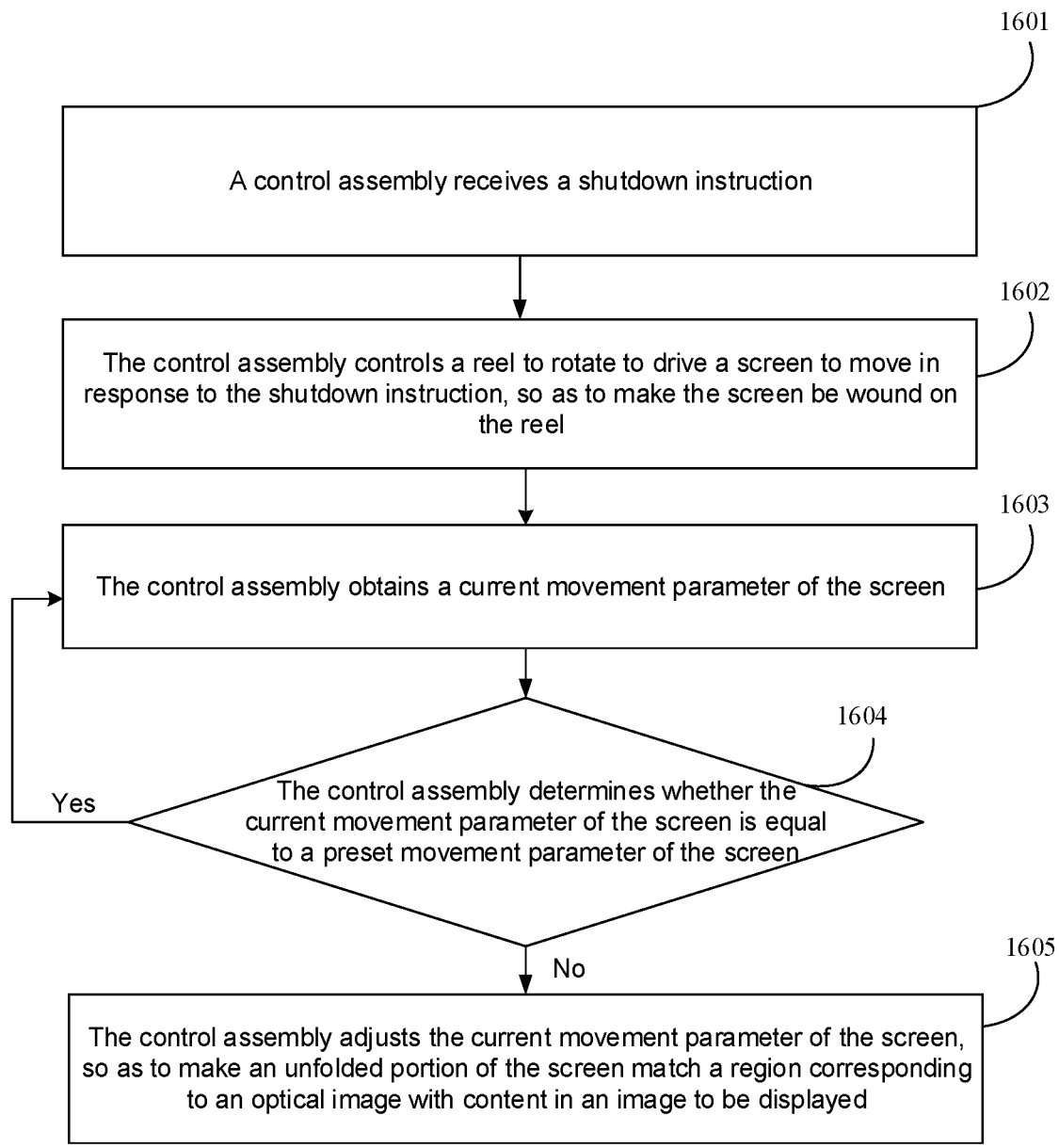
FIG. 16 is a flow diagram of yet another control method of a projection apparatus, in accordance with some embodiments.

As shown in FIG. 16, the control method includes steps 1601 to 1605.

In step 1601, the control assembly 30 receives a shutdown instruction.

In step 1602, the control assembly 30 controls the reel 40 to rotate to drive the screen 20 to move, so as to make the screen 20 be wound on the reel 40.

In step 1603, the control assembly 30 obtains a current movement parameter of the screen 20.

In step 1604, the control assembly 30 determines whether the current movement parameter of the screen 20 is equal to the preset movement parameter of the screen 20.

In step 1605, the control assembly 30 adjusts the current movement parameter of the screen 20 in response to determining that the current movement parameter of the screen 20 is not equal to the preset movement parameter of the screen 20, so as to make an unfolded portion of the screen 20 match a region corresponding to an optical image with content in an image to be displayed.

The projection display structure 10 projects optical images with content at a fixed frequency.

For example, the current descending speed of the screen 20 is adjusted according to the descending speed curves of the screen 20 shown in FIG. 10, so as to adjust the current movement parameter of the screen 20.

In addition, if the current movement parameter of the screen 10 is equal to the preset movement parameter of the screen 20, the control assembly 30 performs step 1603 again. The control assembly 30 does not adjust the current movement parameter of the screen 20.

In this case, the projection display structure maintains the fixed frequency to project optical images with content on the unfolded portion of the screen 20. The region corresponding to the optical image with content decreases as the height of the unfolded portion of the screen 20 decreases. The control assembly 30 may control the projection display structure 10 not to project the optical image on the second region beyond the first region where the unfolded portion of the screen 20 is located, or project the optical image without content on the second region beyond the first region where the unfolded portion of the screen 20 is located.

Some embodiments of the present disclosure provide yet another control method of the projection apparatus. The control method is applied to the projection apparatus 100 in any of the above embodiments. Referring to FIG. 10, the projection apparatus 100 includes the projection display structure 10, the screen 20, the control assembly 30 and the reel 40. The control method is executed at the control assembly 30. The control assembly 30 is configured with the preset movement parameter of the screen 20.

Figure 17:
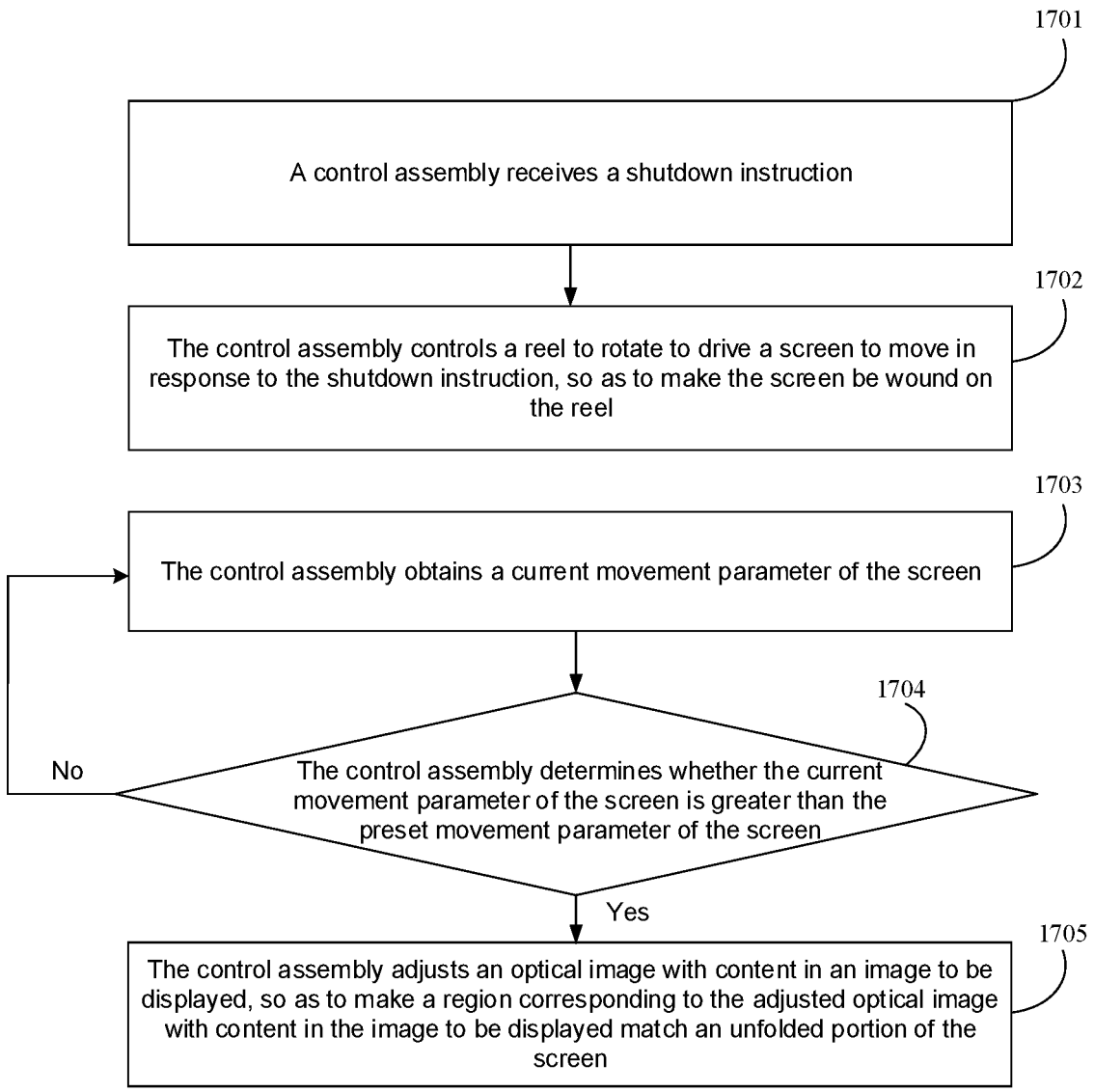
FIG. 17 is a flow diagram of yet another control method of a projection apparatus, in accordance with some embodiments.

As shown in FIG. 17, the control method includes steps 1701 to 1705.

In step 1701, the control assembly 30 receives a shutdown instruction.

In step 1702, the control assembly 30 controls the reel 40 to rotate to drive the screen 20 to move in response to the shutdown instruction, so as to make the screen 20 be wound on the reel 40.

In step 1703, the control assembly 30 obtains a current movement parameter of the screen 20.

In step 1704, the control assembly 30 determines whether the current movement parameter of the screen 20 is greater than the preset movement parameter of the screen 20.

In step 1705, the control assembly 30 adjusts an optical image with content in an image to be displayed in response to determining that the current movement parameter of the screen 20 is greater than the preset movement parameter of the screen 20, so as to make a region corresponding to the adjusted optical image with content in the image to be displayed match an unfolded portion of the screen 20.

In addition, if the current movement parameter of the screen 20 is less than or equal to the preset movement parameter of the screen 20, the control assembly 30 performs step 1703 again. The control assembly 30 does not adjust the optical image with content.

For example, when the height of the current unfolded portion of the screen 20 is less than the preset height, the screen descends fast. In this case, the control assembly 30 removes a portion of the region corresponding to the optical image with content in the image to be displayed, so that the region corresponding to the removed optical image with content in the image to be displayed matches the current unfolded portion of the screen 20. There is at least one pixel row in the removed portion. In this way, the width of the region corresponding to the optical image with content is reduced, so that the width of the region corresponding to the removed optical image with content matches the height of the current unfolded portion of the screen 20. The process of removing can be referred to the description of the above embodiments/examples, which will not be repeated here.

For example, the current movement parameter of the screen 20 is the current height of the unfolded screen 20, and the preset movement parameter of the screen 20 is a preset height of the unfolded screen 20. If the screen descends slowly, the current height of the unfolded portion of the screen 20 is greater than or equal to the preset unfolded height of the screen 20, and the optical image with content may not be adjusted. In this case, the region where the unfolded portion of the screen 20 is located may be greater than or equal to the region where the optical image with content projected.

The projection display structure 10 projects optical images with content at a fixed frequency. The region corresponding to the optical image with content decreases as the height of the unfolded portion of the screen 20 decreases. The control assembly 30 may control the projection display structure 10 not to project the optical image on the second region beyond the first region where the unfolded portion of the screen 20 is located, or project the optical image without content on the second region beyond the first region where the unfolded portion of the screen 20 is located.

It will be noted that, the control method of the projection apparatus 100, connections of components in the projection apparatus involved in the control method of the projection apparatus 100, and the operation process of the components, can be referred to the above embodiments/examples of the description in the projection apparatus 100, and details will not be repeated here.

For example, the control assembly 30 includes a processor. The processor may be a central processing unit (CPU), a microprocessor, a general purpose processor, a digital signal processor (DSP), an application specific integrated circuit (ASIC), a programmable logic device (such as a field programmable gate array (FPGA)), a discrete gate, a transistor logic device, a discrete hardware component, etc.

The beneficial effect of the control method of the projection apparatus is the same as the beneficial effect of the projection apparatus described in any of the embodiments, which will not be repeated here.

It will be understood by a person of ordinary skill in the art that, all or part of the steps of the control method in the above embodiments may be implemented by hardware(s), or may be implemented by a hardware related to program(s).

Some embodiments of the present disclosure provide a non-transitory computer-readable storage medium that stores one or more computer programs. When executed by the control assembly 30 of the projection apparatus 100, the one or more computer programs cause the control assembly 30 to implement the control method of the projection apparatus as described in any of the above embodiments, for example, to implement one or more steps in the control method of the projection apparatus.

For example, the computer-readable storage medium may include, but are not limited to: a magnetic storage device (e.g., a hard disk, a floppy disk, or a tape), an optical disk (e.g., a compact disk (CD), and a digital versatile disk (DVD)), a smart card and a flash memory device (e.g., an erasable programmable read-only memory (EPROM), a card, a stick or a key drive). Various non-computer-readable storage media described in the present disclosure may represent one or more devices or other machine-readable storage media for storing information.

Some embodiments of the present disclosure further provide a computer program product. The computer program product includes one or more computer programs carried on a non-transitory computer-readable storage medium. When executed by the control assembly 30 of the laser projection apparatus, the one or more computer programs cause the control assembly 30 to implement the control method of the projection apparatus as described in the above embodiments, for example, to implement one or more steps in the control method.

The beneficial effects of the non-transitory computer-readable storage medium and the computer program product are the same as the beneficial effects of the control method of the projection apparatus described in any of the embodiments, which will not be repeated here.

The foregoing descriptions are merely exemplary embodiments of the present disclosure, and are not intended to limit the present disclosure. Any modification, equivalent replacement, improvement, etc. made within the spirit and principle of the present disclosure shall be included in the protection scope of the present disclosure.

What is claimed is:

1. A projection apparatus, comprising: a screen, a reel, a projection display structure and a control assembly, wherein,
the projection display structure is configured to sequentially project a plurality of images to be displayed, wherein each image to be displayed includes an optical image with content, and optical images with content in at least two images to be displayed are different;
the screen is configured to display at least one optical image with content in the plurality of images to be displayed;
the control assembly is connected to the reel and is configured to control the reel to rotate;
the reel is connected to the screen and is configured to drive the screen to be unfolded from or wound on the reel when rotating; and
the control assembly is further connected to the projection display structure; and is further configured: to control the projection display structure to project the optical image with content in the image to be displayed onto an unfolded portion of the screen, and control a region corresponding to the optical image with content in the image to be displayed projected by the projection display structure to change as the unfolded portion of the screen changes; and
the control assembly is further configured to obtain a current movement parameter of the screen, and adjust the current movement parameter of the screen according to an optical image with content in a current image to be displayed in the plurality of images to be displayed, so as to make a current unfolded portion of the screen match a region corresponding to the optical image with content in the current image to be displayed.

2. The projection apparatus according to claim 1, wherein the projection display structure is configured to sequentially project the plurality of images to be displayed at a fixed frequency.

3. The projection apparatus according to claim 1, wherein the control assembly is configured with a preset movement parameter of the screen and a preset projection region corresponding to the optical image with content in each image to be displayed; and the control assembly is further configured to:
  obtain a current movement parameter of the screen;
  determine whether the current movement parameter is greater than the preset movement parameter; and
  control the projection display structure to project the plurality of images to be displayed at a fixed frequency in response to determining that the current movement parameter is greater than the preset movement parameter, so as to make the preset projection region of the optical image with content in the image to be displayed is in a region where the unfolded portion of the screen is located.

4. The projection apparatus according to claim 1, wherein the current movement parameter of the screen includes at least one of a movement duration of the screen, an amount of change in height of the unfolded portion of the screen, or a movement speed of the screen.

5. The projection apparatus according to claim 1, wherein the control assembly is further configured to control the projection display structure not to project an optical image on a second region beyond a first region where the unfolded portion of the screen is located; or
  the image to be displayed further includes an optical image without content, and the control assembly is further configured to control the projection display structure to project the optical image without content in the image to be displayed on the second region beyond the first region where the unfolded portion of the screen is located.

6. The projection apparatus according to claim 5, wherein the image to be displayed is provided with a plurality of pixels; and pixel values of pixels in the optical image without content in the image to be displayed are the same.

7. A control method of the projection apparatus according to claim 1, the control method being performed at the control assembly, the control method comprising:
  receiving a startup instruction;
  controlling the reel to rotate to drive the screen to move in response to the startup instruction, so as to make the screen be unfolded from the reel; and
  controlling the projection display structure to project the optical image with content in the image to be displayed onto the unfolded portion of the screen in response to the startup instruction, wherein a region corresponding to the optical image with content in the image to be displayed increases as the unfolded portion of the screen increases.

8. The control method according to claim 7, wherein the control assembly is configured with a preset movement parameter of the screen, and the control method further comprises:
  obtaining a current movement parameter of the screen;
  determining whether the current movement parameter is equal to the preset movement parameter; and
  adjusting the current movement parameter in response to determining that the current movement parameter is not equal to the preset movement parameter, so as to make the unfolded portion of the screen match the region corresponding to the optical image with content in the image to be displayed.

9. The control method according to claim 7, wherein the control assembly is configured with a preset movement parameter of the screen, and the control method further comprises:
  obtaining a current movement parameter of the screen;
  determining whether the current movement parameter is less than the preset movement parameter; and
  adjusting the optical image with content in response to determining that the current movement parameter is less than the preset movement parameter, so as to make the region corresponding to the adjusted optical image with content in the image to be displayed match the unfolded portion of the screen.

10. A control method of the projection apparatus according to claim 1, the control method being performed at the control assembly, the control method comprising:
  receiving a shutdown instruction;
  controlling the reel to rotate to drive the screen to move in response to the shutdown instruction, so as to make the screen be wound on the reel; and
  controlling the projection display structure to project the optical image with content in the image to be displayed onto the unfolded portion of the screen in response to the shutdown instruction, wherein a region corresponding to the optical image with content in the image to be displayed decreases as the unfolded portion of the screen decreases.

11. The control method according to claim 10, wherein the control assembly is configured with a preset movement parameter of the screen, and the control method further comprises:
  obtaining a current movement parameter of the screen,
  determining whether the current movement parameter is equal to the preset movement parameter; and
  adjusting the current movement parameter of the screen in response to determining that the current movement parameter of the screen is not equal to the preset movement parameter of the screen, so as to make the unfolded portion of the screen match the region corresponding to the optical image with content in the image to be displayed.

12. The control method according to claim 10, wherein the control assembly is configured with a preset movement parameter of the screen, and the control method further comprises:
  obtaining a current movement parameter of the screen,
  determining whether the current movement parameter is greater than the preset movement parameter; and
  adjusting the optical image with content in the image to be displayed in response to determining that the current movement parameter of the screen is greater than the preset movement parameter of the screen, so as to make the region corresponding to the adjusted optical image with content in the image to be displayed match the unfolded portion of the screen.

13. A projection apparatus, comprising: a screen, a reel, a projection display structure and a control assembly, wherein,
  the projection display structure is configured to sequentially project a plurality of images to be displayed, wherein each image to be displayed includes an optical image with content, and optical images with content in at least two images to be displayed are different;
  the screen is configured to display at least one optical image with content in the plurality of images to be displayed;
  the control assembly is connected to the reel and is configured to control the reel to rotate;
  the reel is connected to the screen and is configured to drive the screen to be unfolded from or wound on the reel when rotating; and
  the control assembly is further connected to the projection display structure; and the control assembly is further configured to: control the projection display structure to project the optical image with content in the image to be displayed onto an unfolded portion of the screen, and control a region corresponding to the optical image with content in the image to be displayed projected by the projection display structure to change as the unfolded portion of the screen changes, and the control assembly is further configured to obtain a current movement parameter of the screen, and adjust a frequency of projecting the plurality of images to be displayed according to the current movement parameter of the screen, so as to make regions corresponding to optical images with content in the plurality of images to be displayed match a current unfolded portion of the screen.

14. The projection apparatus according to claim 13, wherein the projection display structure is configured to sequentially project the plurality of images to be displayed at a fixed frequency.

15. The projection apparatus according to claim 13, wherein the current movement parameter of the screen includes at least one of a movement duration of the screen, an amount of change in height of the unfolded portion of the screen, or a movement speed of the screen.

16. The projection apparatus according to claim 13, wherein the control assembly is further configured to control the projection display structure not to project an optical image on a second region beyond a first region where the unfolded portion of the screen is located; or the image to be displayed further includes an optical image without content, and the control assembly is further configured to control the projection display structure to project the optical image without content in the image to be displayed on the second region beyond the first region where the unfolded portion of the screen is located.

17. A projection apparatus, comprising: a screen, a reel, a projection display structure and a control assembly, wherein, the projection display structure is configured to sequentially project a plurality of images to be displayed, wherein each image to be displayed includes an optical image with content, and optical images with content in at least two images to be displayed are different;

the screen is configured to display at least one optical image with content in the plurality of images to be displayed;

the control assembly is connected to the reel and is configured to control the reel to rotate;

the reel is connected to the screen and is configured to drive the screen to be unfolded from or wound on the reel when rotating; and the control assembly is further connected to the projection display structure; and the control assembly is further configured to: control the projection display structure to project the optical image with content in the image to be displayed onto an unfolded portion of the screen, and control a region corresponding to the optical image with content in the image to be displayed projected by the projection display structure to change as the unfolded portion of the screen changes, and the control assembly is configured with a preset movement parameter of the screen, and the control assembly is further configured to obtain a current movement parameter of the screen, and select an image to be displayed that an optical image with content therein matches a current unfolded portion of the screen to project according to the current movement parameter.

18. The projection apparatus according to claim 17, wherein the projection display structure is configured to sequentially project the plurality of images to be displayed at a fixed frequency.

19. The projection apparatus according to claim 17, wherein the current movement parameter of the screen includes at least one of a movement duration of the screen, an amount of change in height of the unfolded portion of the screen, or a movement speed of the screen.

20. The projection apparatus according to claim 17, wherein the control assembly is further configured to control the projection display structure not to project an optical image on a second region beyond a first region where the unfolded portion of the screen is located; or the image to be displayed further includes an optical image without content, and the control assembly is further configured to control the projection display structure to project the optical image without content in the image to be displayed on the second region beyond the first region where the unfolded portion of the screen is located.

* * * * *